(12) United States Patent
Baltz et al.

(10) Patent No.: US 9,611,071 B2
(45) Date of Patent: Apr. 4, 2017

(54) DELIVERY AND MERCHANDISING SYSTEM

(71) Applicant: Rehrig Pacific Company, Los Angeles, CA (US)

(72) Inventors: Kyle Baltz, Rossmoor, CA (US); John Zelek, Los Angeles, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 14/212,490

(22) Filed: Mar. 14, 2014

(65) Prior Publication Data
US 2014/0283713 A1    Sep. 25, 2014

Related U.S. Application Data

(60) Provisional application No. 61/785,738, filed on Mar. 14, 2013.

(51) Int. Cl.
| | |
|---|---|
| *B65D 19/44* | (2006.01) |
| *B65D 19/00* | (2006.01) |
| *B62B 5/00* | (2006.01) |
| *B62B 5/06* | (2006.01) |

(52) U.S. Cl.
CPC ............ *B65D 19/44* (2013.01); *B62B 5/0093* (2013.01); *B65D 19/0016* (2013.01); *B62B 5/067* (2013.01); *B62B 2202/021* (2013.01); *B62B 2203/28* (2013.01); *B62B 2205/104* (2013.01); *B65D 2519/00034* (2013.01); *B65D 2519/00069* (2013.01); *B65D 2519/00268* (2013.01); *B65D 2519/00288* (2013.01); *B65D 2519/00318* (2013.01); *B65D 2519/00412* (2013.01); *B65D 2519/00781* (2013.01); *B65D 2519/00796* (2013.01)

(58) Field of Classification Search
CPC ........... B65D 2519/00034; B65D 2519/00069; B65D 2519/00258; B65D 2519/00268; B65D 2519/00283; B65D 2519/00288; B65D 2519/00308
USPC .... 108/57.25, 57.28, 51.11, 53.1, 55.1, 55.3, 108/55.5
See application file for complete search history.

(56) References Cited

U.S. PATENT DOCUMENTS

| | | | | | |
|---|---|---|---|---|---|
| 1,832,041 | A | * | 11/1931 | Moehler | ......................... 280/35 |
| 2,386,516 | A | * | 10/1945 | Thompson | .................. 108/55.3 |
| 2,707,351 | A | * | 5/1955 | Walker | ......................... 280/79.2 |
| 2,971,768 | A | * | 2/1961 | Ackley et al. | .................. 280/35 |
| 3,628,468 | A | * | 12/1971 | Angelbeck, Jr. | ... B65D 19/0014 108/53.1 |
| 3,848,546 | A | * | 11/1974 | Lawlor | ............. B65D 19/0012 108/53.1 |

(Continued)

*Primary Examiner* — Jose V Chen
(74) *Attorney, Agent, or Firm* — Carlson, Gaskey & Olds PC

(57) ABSTRACT

A pallet includes a deck having an upper surface for supporting goods thereon. The deck includes a plurality of ribs extending downward. According to one feature, the ribs may form plurality of stringers extending downward below the deck. Some of the ribs may be shorter in order to form a notch at each end of the stringers for engaging supports in a rack. In another feature, a plurality of locating features project upward from the surface of the deck. The plurality of locating features may each be generally in the shape of a pyramid for being received in the recessed bases of stackable plastic milk jugs.

21 Claims, 30 Drawing Sheets

(56) References Cited

U.S. PATENT DOCUMENTS

| | | | | |
|---|---|---|---|---|
| 3,948,190 | A * | 4/1976 | Cook et al. | 108/53.3 |
| 4,203,609 | A * | 5/1980 | Mitchell et al. | 108/55.3 |
| 4,653,651 | A * | 3/1987 | Flum | 108/55.3 |
| 4,712,966 | A * | 12/1987 | Gross | 108/55.3 |
| 4,865,202 | A * | 9/1989 | Day | 108/55.3 |
| 4,921,264 | A * | 5/1990 | Duffy | 108/55.3 |
| 5,016,761 | A * | 5/1991 | Stoddard | A47F 3/14 108/55.1 |
| 5,312,121 | A * | 5/1994 | Chapman | 280/47.11 |
| 5,360,112 | A * | 11/1994 | Beauchamp | 108/55.3 |
| 5,769,003 | A * | 6/1998 | Rose | B65D 19/004 108/51.11 |
| 5,809,904 | A * | 9/1998 | Darby | B65D 19/0081 108/53.5 |
| 5,868,080 | A * | 2/1999 | Wyler | B65D 19/0022 108/57.25 |
| 6,164,214 | A * | 12/2000 | Smorgon et al. | 108/57.28 |
| 6,209,891 | B1 * | 4/2001 | Herrmann | 280/79.2 |
| 6,250,234 | B1 * | 6/2001 | Apps | B29C 65/02 108/57.25 |
| 6,345,828 | B1 * | 2/2002 | Pool et al. | 280/32.6 |
| 6,508,182 | B1 * | 1/2003 | Smorgan et al. | 108/57.28 |
| 6,626,634 | B2 * | 9/2003 | Hwang et al. | 108/51.11 |
| 7,140,622 | B1 * | 11/2006 | Cantu | 108/55.3 |
| 7,856,932 | B2 * | 12/2010 | Stahl et al. | 108/53.3 |
| 8,191,486 | B2 * | 6/2012 | Apps et al. | 108/57.25 |
| 8,317,150 | B2 * | 11/2012 | Baechle | 108/55.3 |
| 8,622,006 | B2 * | 1/2014 | Dubois | B65D 19/0022 108/56.1 |
| 2003/0061974 | A1 * | 4/2003 | Smyers | B65D 19/0012 108/56.1 |
| 2007/0215014 | A1 * | 9/2007 | Lee | 108/51.11 |
| 2010/0107934 | A1 * | 5/2010 | Hsieh | 108/53.1 |
| 2012/0304898 | A1 * | 12/2012 | Dubois | B65D 19/0063 108/57.25 |

* cited by examiner

DELIVERY AND MERCHANDISING SYSTEM

BACKGROUND

Many grocery store goods are shipped in boxes and/or on pallets. At the store, the goods must be removed from the boxes and or pallets and placed on a shelf for selection by the customers.

For refrigerated goods, such as plastic jugs of milk, the jugs must be placed onto shelves in a refrigerator. This is even more time consuming for the delivery person or the grocery store employee.

SUMMARY

A pallet according to at least one example embodiment of the present invention has a deck having an upper surface for supporting goods thereon. The deck includes a plurality of ribs extending downward.

According to one feature, the ribs may form plurality of stringers extending downward below the deck. Some of the ribs may be shorter in order to form a notch at each end of the stringers for engaging supports in a rack.

In another feature, a plurality of locating features project upward from the surface of the deck. The plurality of locating features may each be generally in the shape of a pyramid for being received in the recessed bases of stackable plastic milk jugs.

Several novel dolly designs are also disclosed for use with the pallets or other pallet designs.

DETAILED DESCRIPTION

Figure 1:
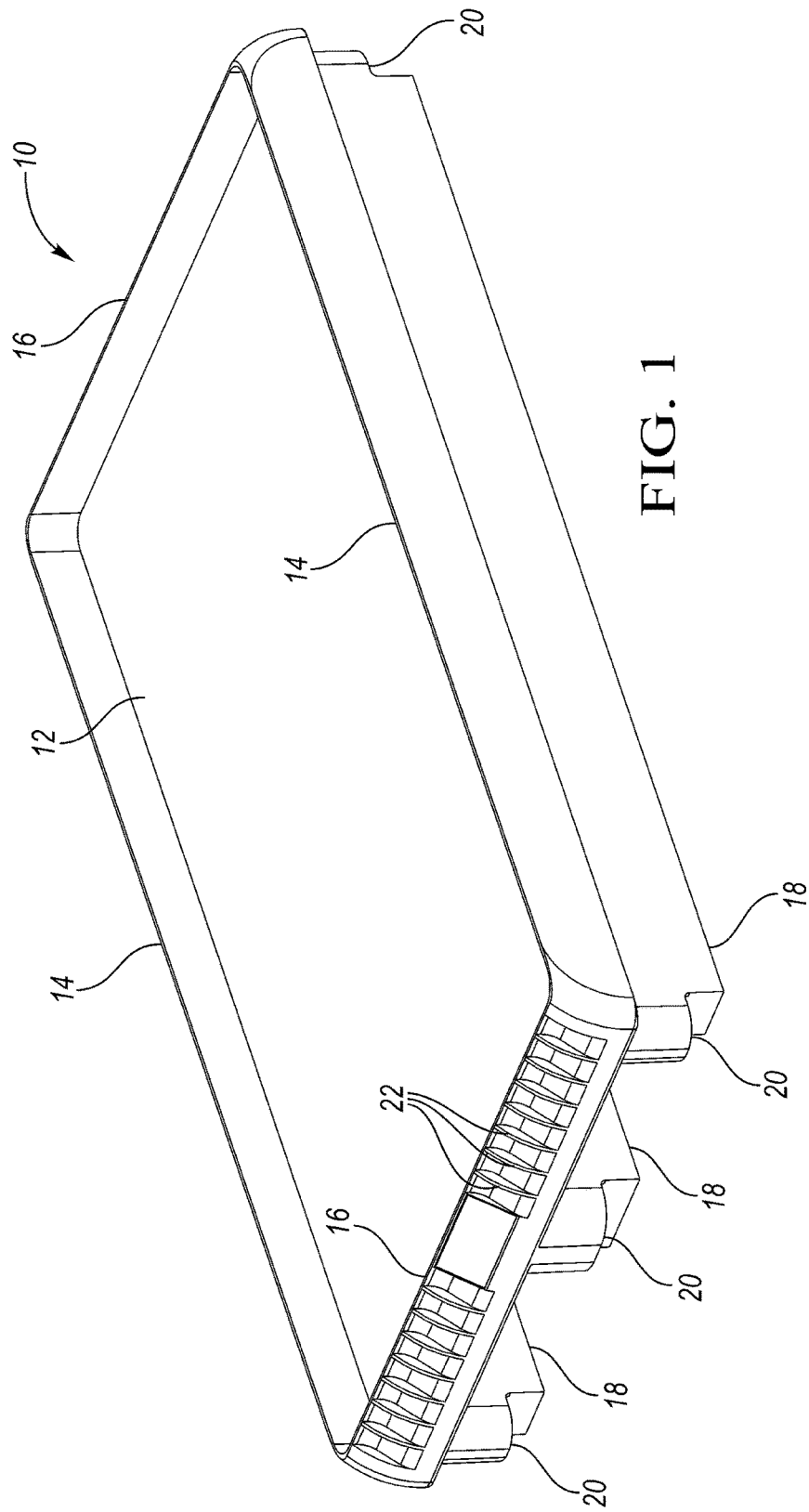
FIG. 1 is a perspective view of a pallet according to one embodiment of the present invention.

A pallet 10 according to a first embodiment is shown in FIGS. 1-4. FIG. 1 is a perspective view of the pallet 10. Referring to FIG. 1, the pallet 10 includes a deck 12, which in this example is a planar wall. A pair of opposed side walls 14 and a pair of opposed end walls 16 extend upward from the periphery of the deck 12 to form a lip around the upper surface of the deck 12. The side walls 14 are longer than the end walls 16 in this example, as the deck 12 is elongated.

A plurality of supports or stringers 18 (three, in this example) extend downward from the deck 12. The stringers 18 extend parallel to one another and parallel to the side walls 14. Each end of each stringer 18 has a notch 20 formed therein, the notch 20 opening downward. The outer surface of each end wall 16 includes a plurality of ribs 22, which may be convex as shown.

Figure 2:
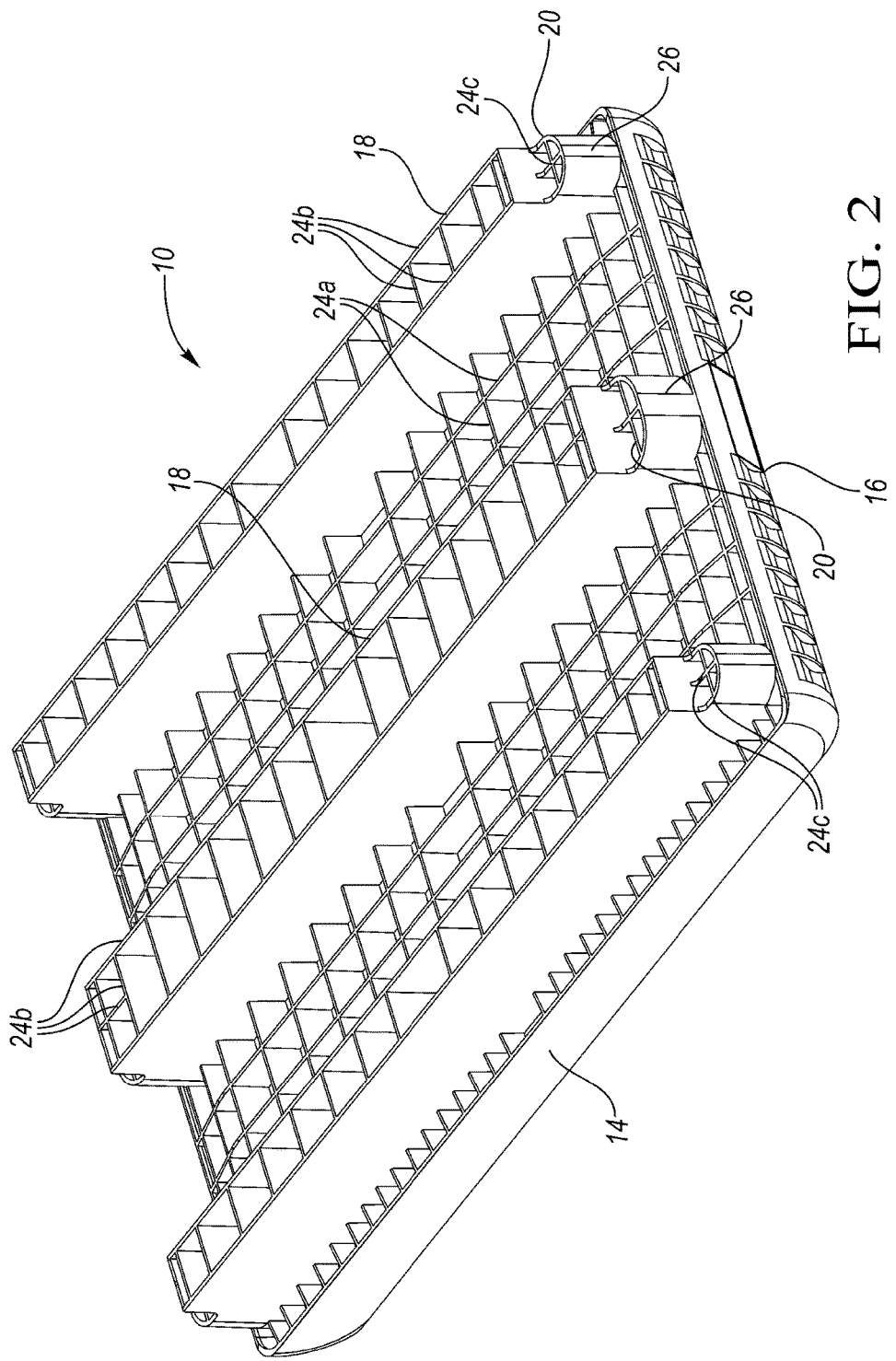
FIG. 2 is a bottom perspective view of the pallet of FIG. 1.

FIG. 2 is a bottom perspective view of the pallet 10. A plurality of transverse ribs 24*a-c* extend downward from upper wall of the deck 12. Short ribs 24*a* reinforce the deck 12 and extend between the stringers 18. Long ribs 24*b* are longer than the short ribs 24*a* and form the stringers 18 (other than the outer ends of the stringers 18). The intermediate ribs 24*c* are shorter than the long ribs 24*b* that form the main of the stringers 18, but taller than the ribs 24*a* that form most of the deck 12. The intermediate ribs 24*c* form the outer ends 26 of the stringers 18 to define the notches 20. The outer ends 26 of the stringers 18, above the notches 20, may be convex as shown in order to deflect contact from tines of a fork or lift jack.

Figure 3:
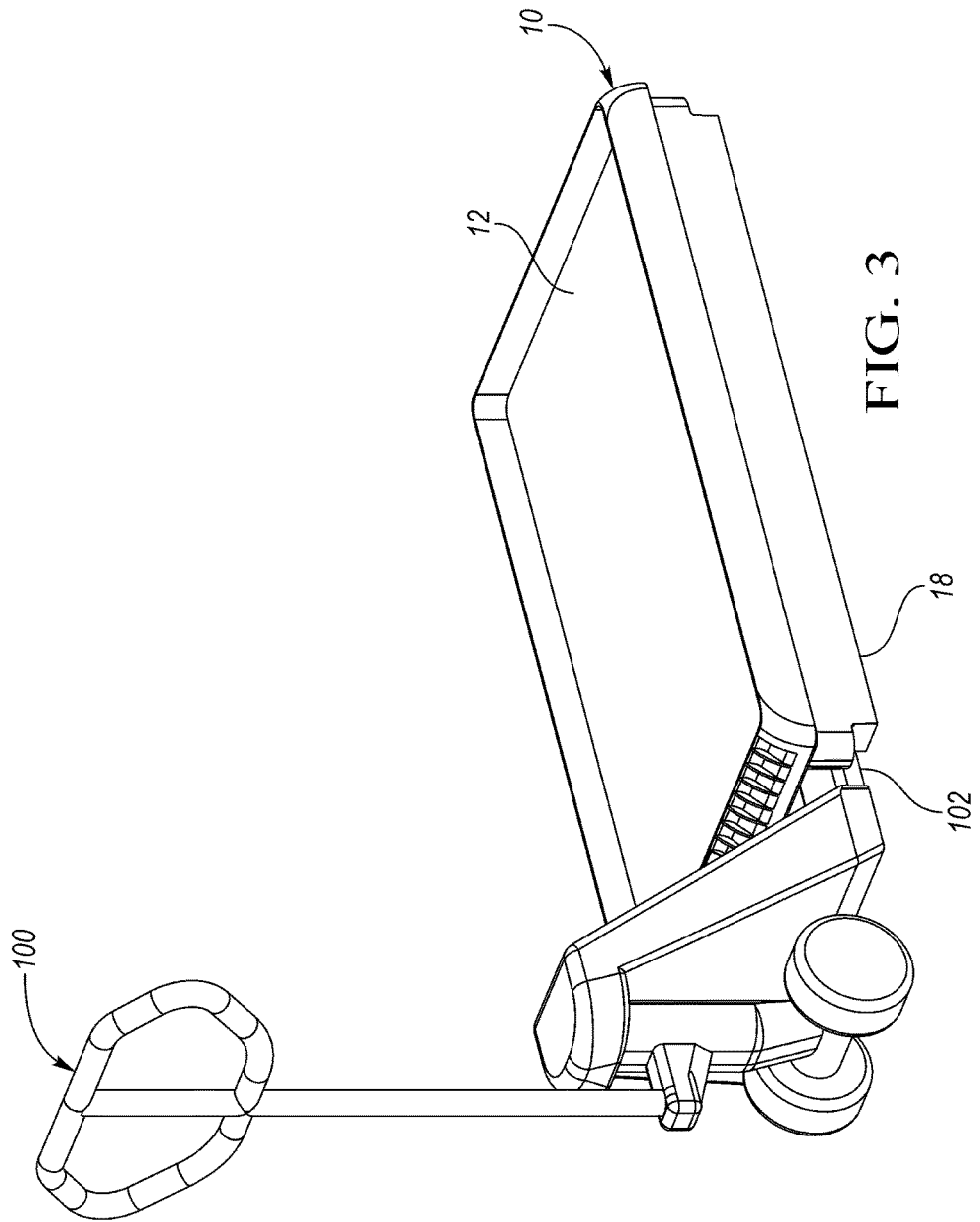
FIG. 3 shows the pallet of FIG. 1 being engaged by a lift jack.

FIG. 3 shows the pallet 10 being engaged by a lift jack 100 having a handle and tines 102. The tines 102 extend into the openings defined between the stringers 18 at either end of the pallet 10. In this manner, the pallet 10 can be lifted and moved easily by a user, especially when the pallet 10 is loaded with goods, such as shown in FIG. 4.

Figure 4:
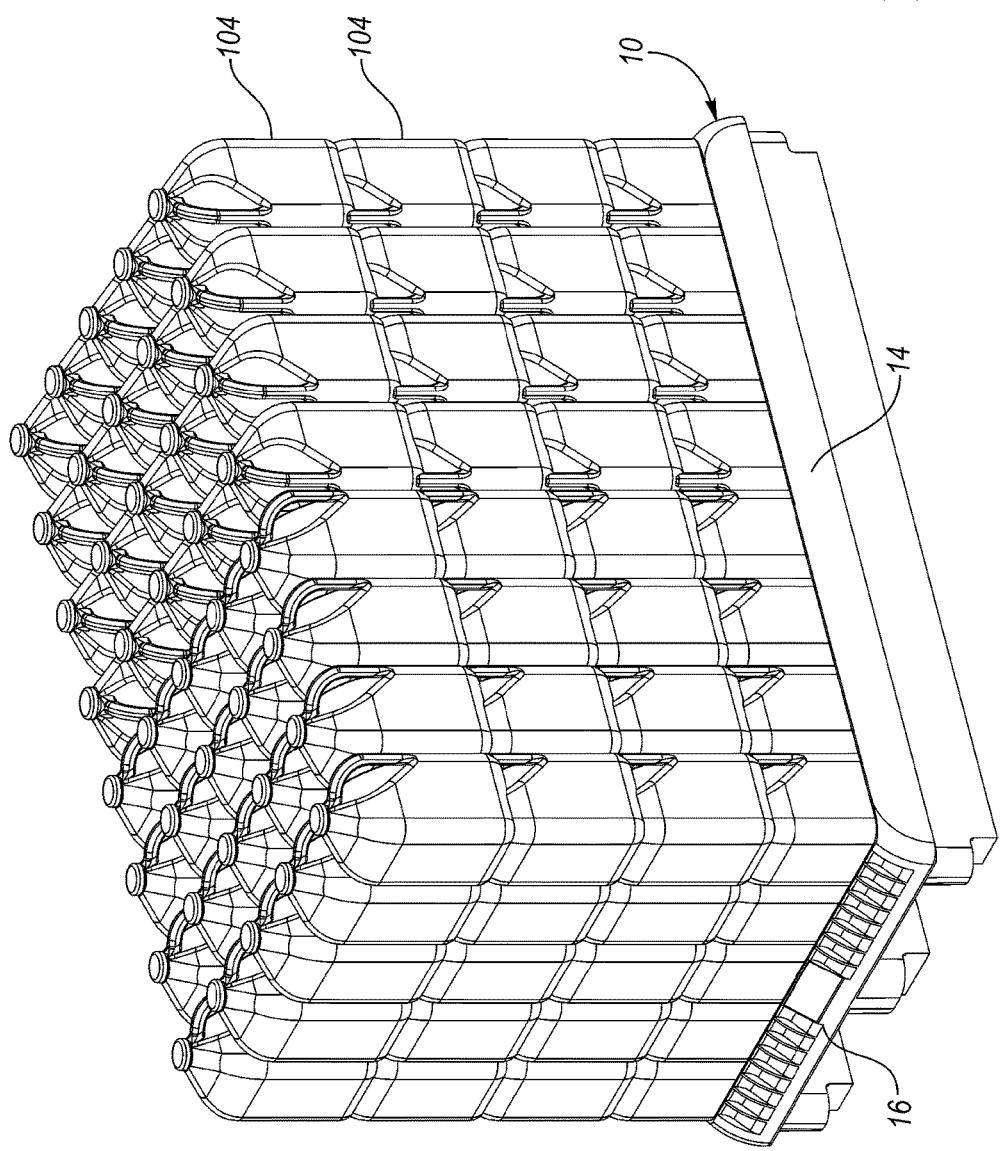
In FIG. 4, the pallet of FIG. 1 is loaded with goods, for example plastic milk jugs.

In FIG. 4, the pallet 10 is loaded with items, for example plastic jugs 104, such as plastic milk jugs. The jugs 104 may be the stackable plastic milk jugs in which the spout of one jug is received in a recess in a base of the jug stacked thereon. The loaded pallet 10 can be moved by the lift jack 100 of FIG. 3 into the cooler at a store. Consumers can select the jugs 104 from the pallet out of the cooler. When the pallet 10 is empty, the pallet 10 is reused.

FIGS. 5-9 show a pallet 110 and dolly 128 according to another embodiment. The pallet 110 includes a deck 112, which in this example is a generally horizontal planar upper wall. A pair of opposed side walls 114 and a pair of opposed end walls 116 extend upward from the periphery of the deck 112 to form a lip around the upper surface of the deck 112. The side walls 114 are longer than the end walls 116 in this example, as the deck 112 is elongated.

The pallet 110 is supported on a frame 130 of the dolly 128. The frame 130 includes a plurality of casters (swiveling or fixed) supporting the frame 130 and pallet 110, so that the pallet 110 (and goods thereon) can be rolled about on wheels without a lift jack or other lifting means.

Figure 5:
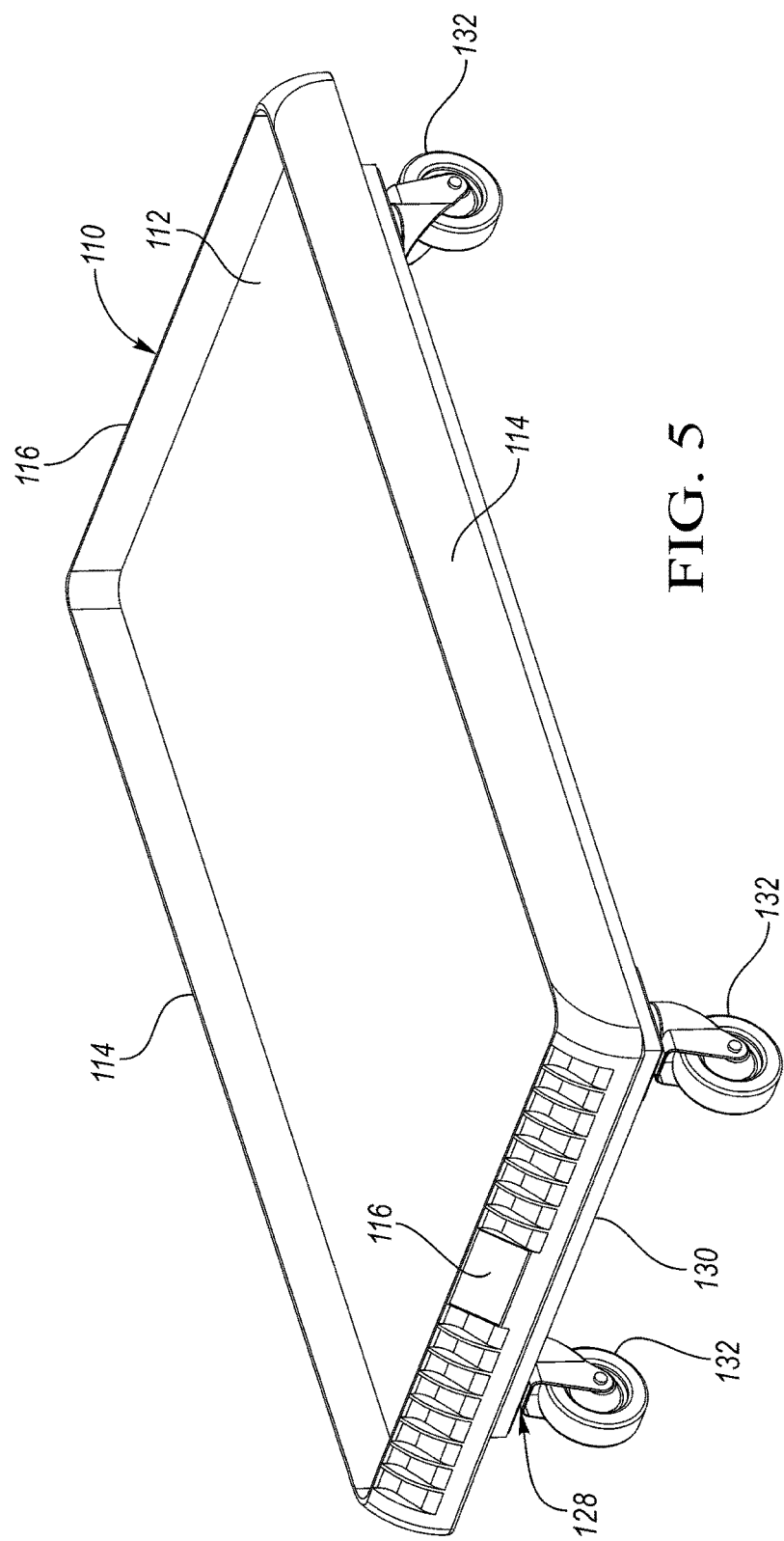
FIG. 5 is a perspective view of a pallet according to a second embodiment on a dolly.
Figure 6:
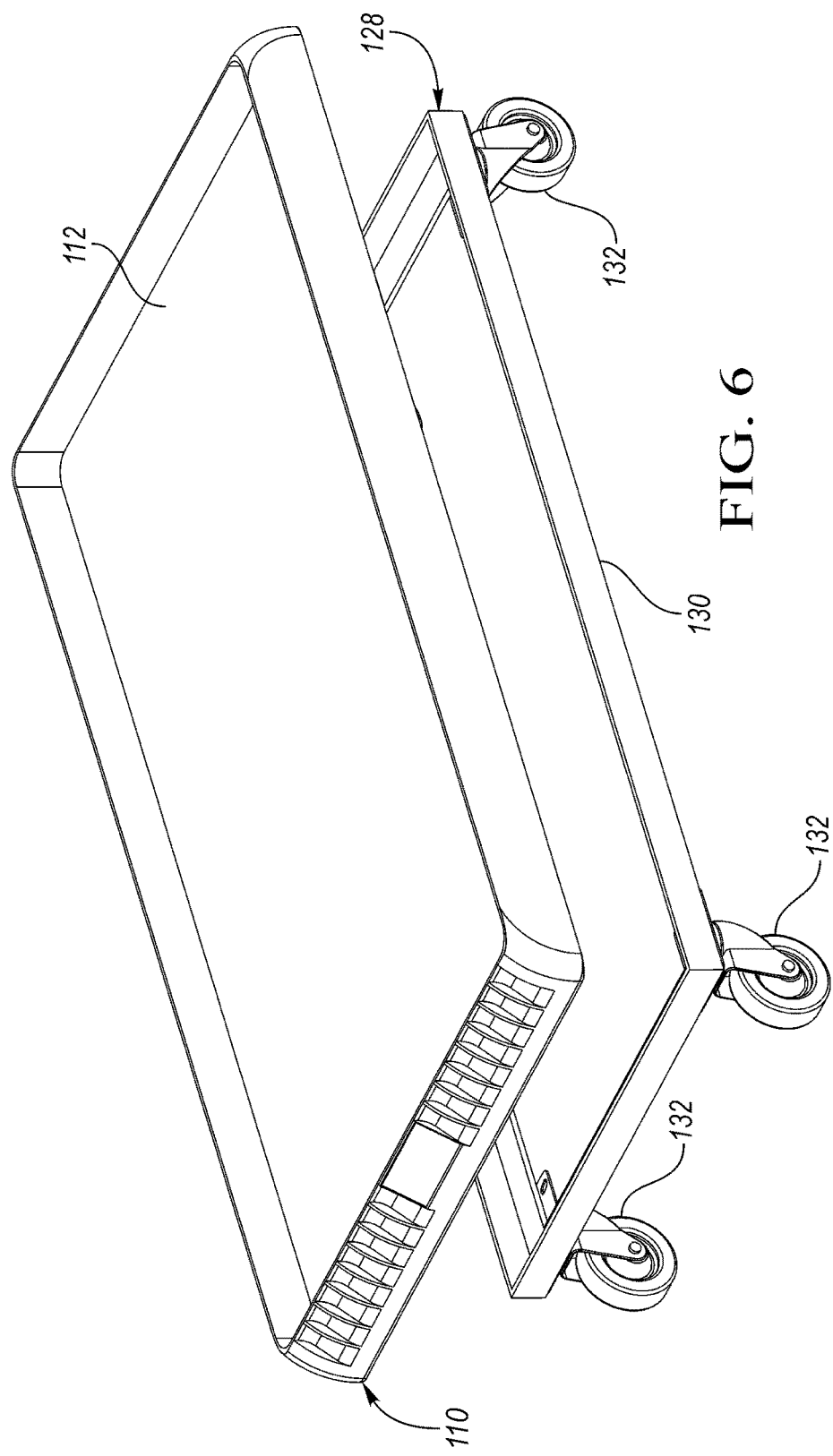
FIG. 6 is an exploded view of the pallet and dolly of FIG. 5.
Figure 7:
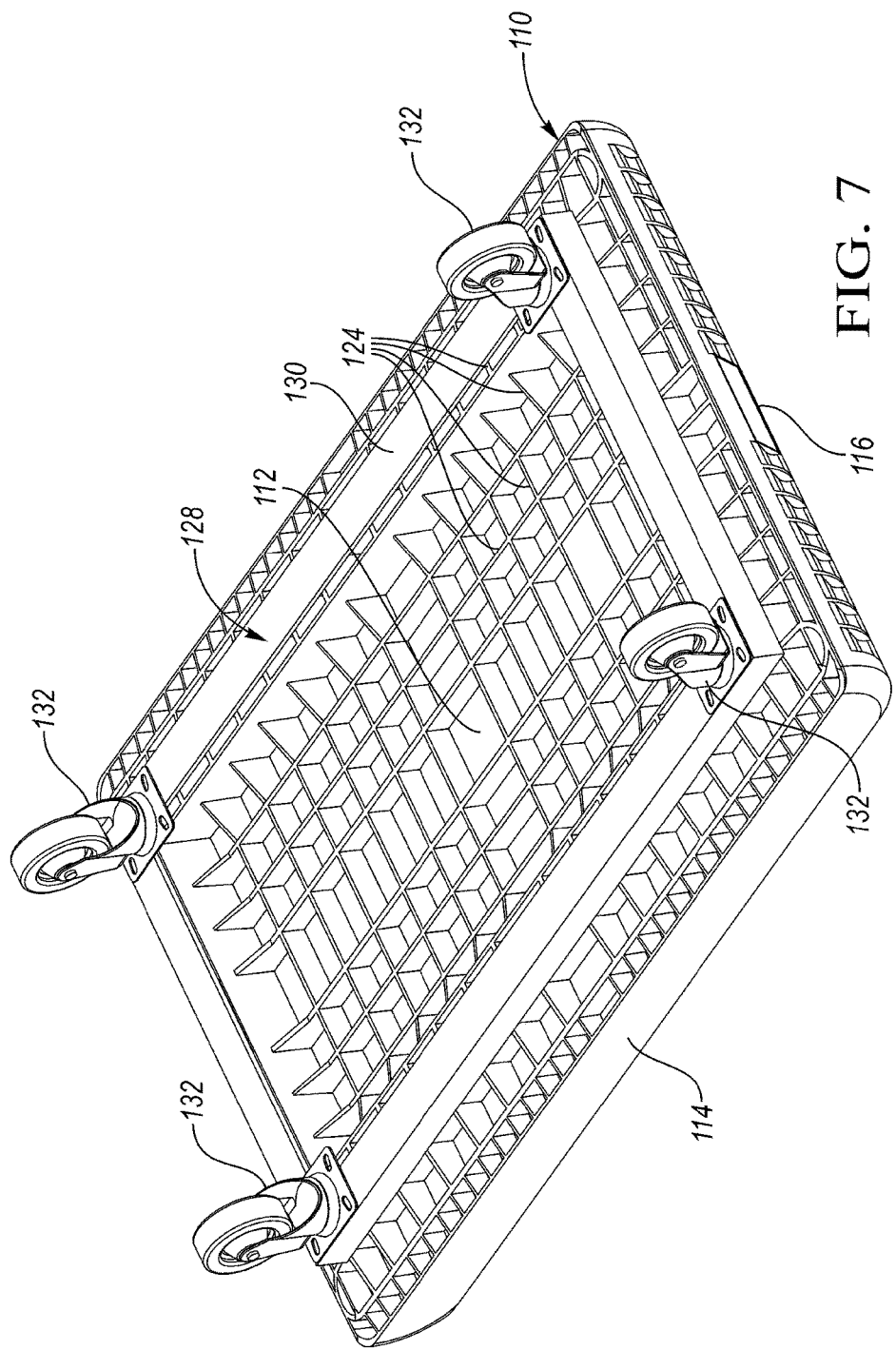
FIG. 7 is a bottom view of the pallet and dolly of FIG. 5.
Figure 8:
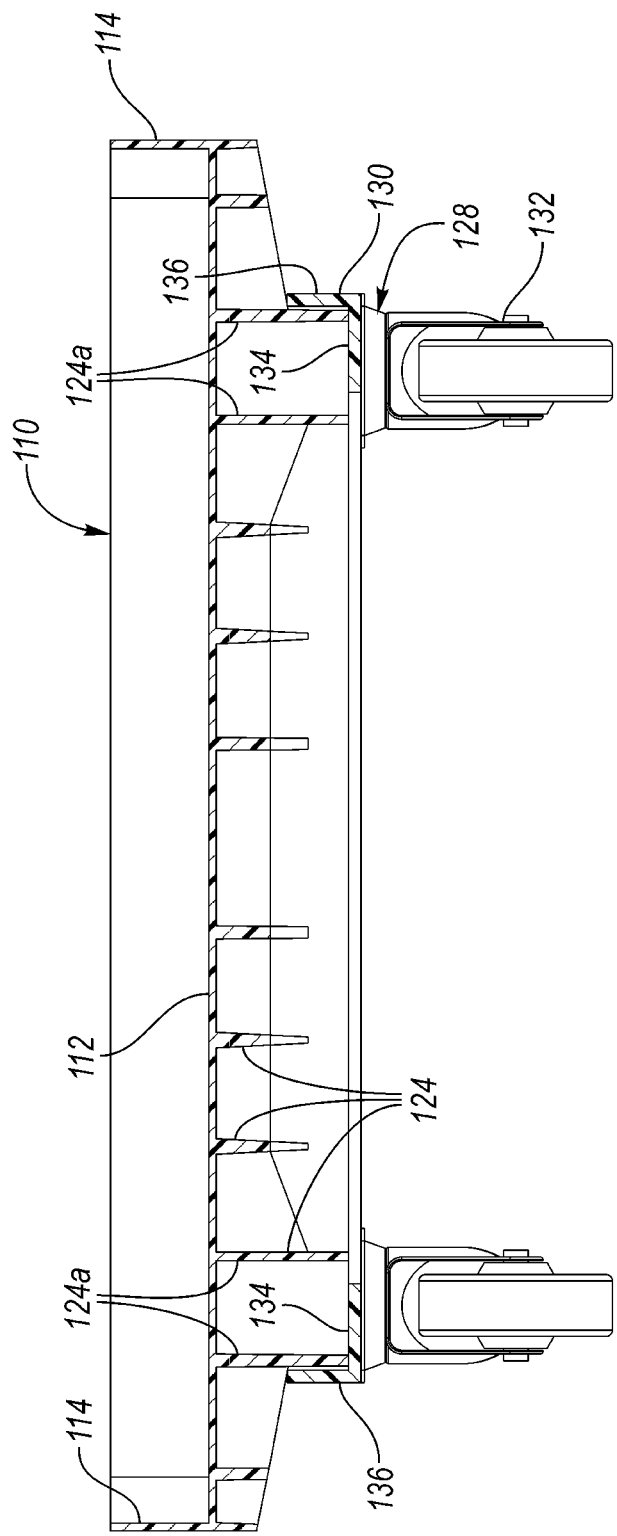
FIG. 8 is a section view of the pallet and dolly of FIG. 5.

FIG. 6 is an exploded view of the pallet 110 and dolly 128 of FIG. 5. FIG. 7 is a bottom view of the pallet 110 and dolly 128 of FIG. 5. A plurality of transverse ribs 124 extend downward from the deck 112. Referring to FIG. 8, some of the ribs 124a are longer than others and form a frame which is received by the frame 130 of the dolly 128. As shown in the cross section of FIG. 8, the frame 130 includes L-brackets having a horizontal wall portion 134 and an outer vertical wall portion 136. The ribs 124a are supported on the horizontal wall portions 134 within the vertical wall portions 136.

Figure 9:
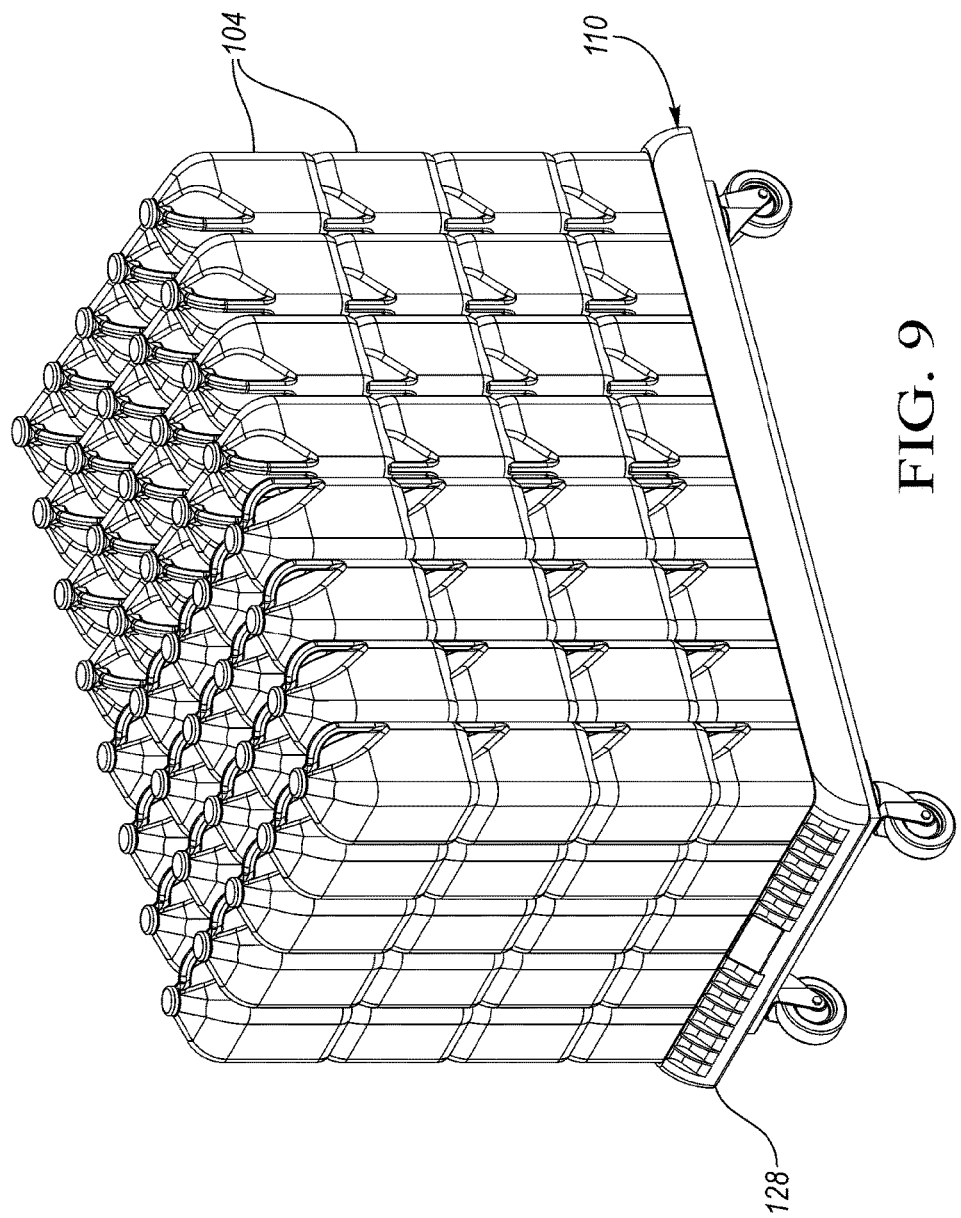
FIG. 9 shows the plastic milk jugs stacked on the pallet and dolly of FIG. 5.

As shown in FIG. 9, the items (such as the plastic milk jugs 104) can be stacked on the pallet 110 and rolled about on the dolly 128 without need of a lift jack.

Figure 10:
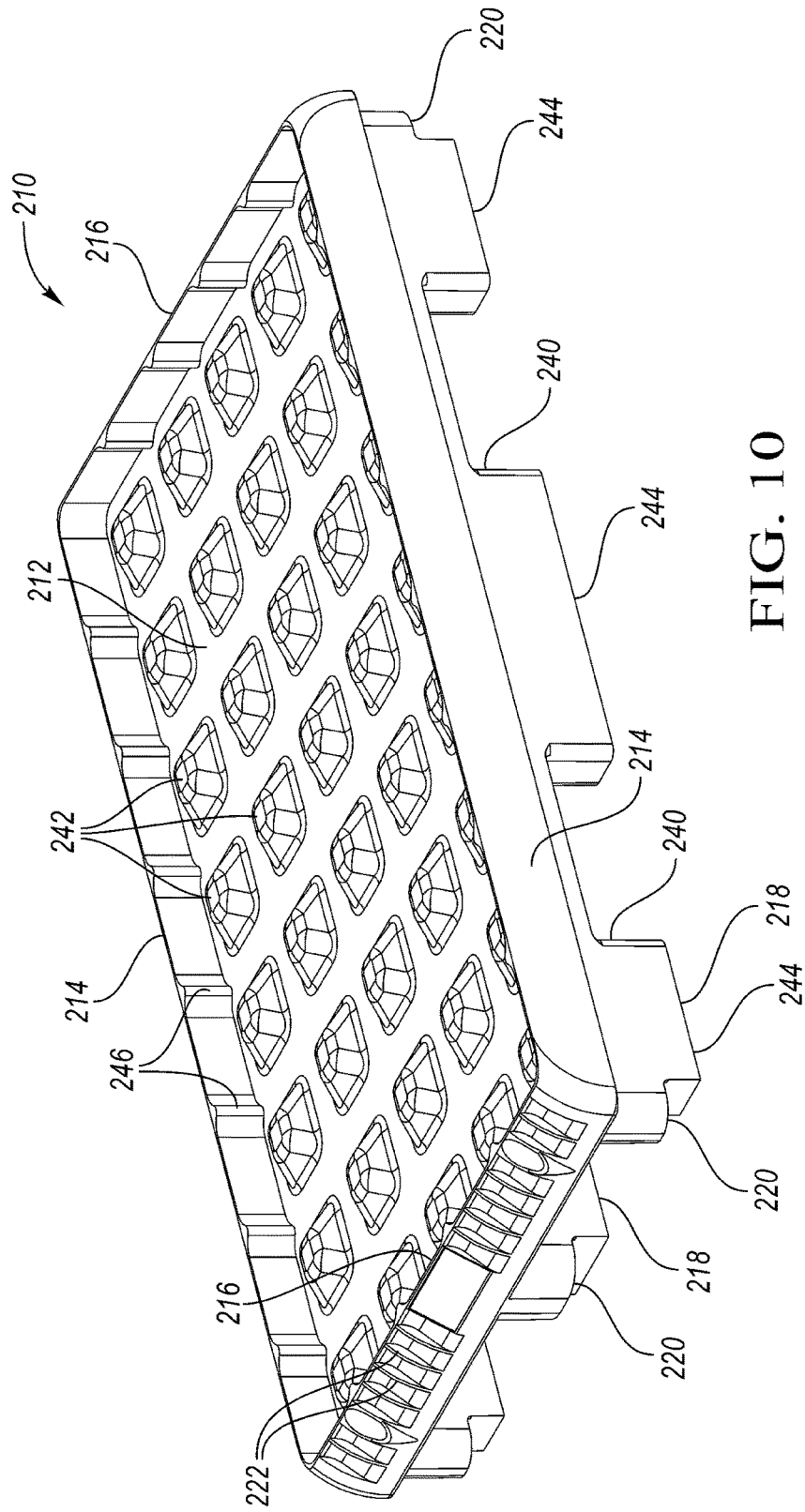
FIG. 10 is a perspective view of a pallet according to a third embodiment.

FIG. 10 is a perspective view of a pallet 210 according to another embodiment. The pallet 210 includes a deck 212, which in this example is a planar upper wall. A pair of opposed side walls 214 and a pair of opposed end walls 216 extend upward from the periphery of the deck 212 to form a lip around the upper surface of the deck 212. The side walls 214 are longer than the end walls 216 in this example, as the deck 212 is elongated.

A plurality of stringers 218 (three, in this example) extend downward from the deck 212. The stringers 218 extend parallel to one another and parallel to the side walls 214. Each end of each stringer 218 has a notch 220 formed therein. The outer surface of each end wall 216 includes a plurality of ribs 222, which may be convex as shown.

In this embodiment, the stringers 218 each include a pair of transverse openings 240 for receiving tines of a fork or lift jack. Thus, the pallet 210 can be engaged by a fork or lift jack either parallel to the stringers 218 or transversely to the stringers 218. The openings 240 effectively define a plurality of columns 244 as part of each stringer 218, the columns 244 supporting the deck 212.

A plurality of spaced-apart dividers or wedges 246 project inward from the side walls 214 and the end walls 216. A plurality of locating features 242 project upward on the upper surface of the deck 212. The example locating features 242 are generally in the shape of a pyramid (with somewhat rounded edges), but cones (or truncated cones or rounded tip cones) or ribs or other shapes could also be used. The particular shape may depend upon the particular containers to be shipped on the pallet 210, as will be explained below.

Figure 11:
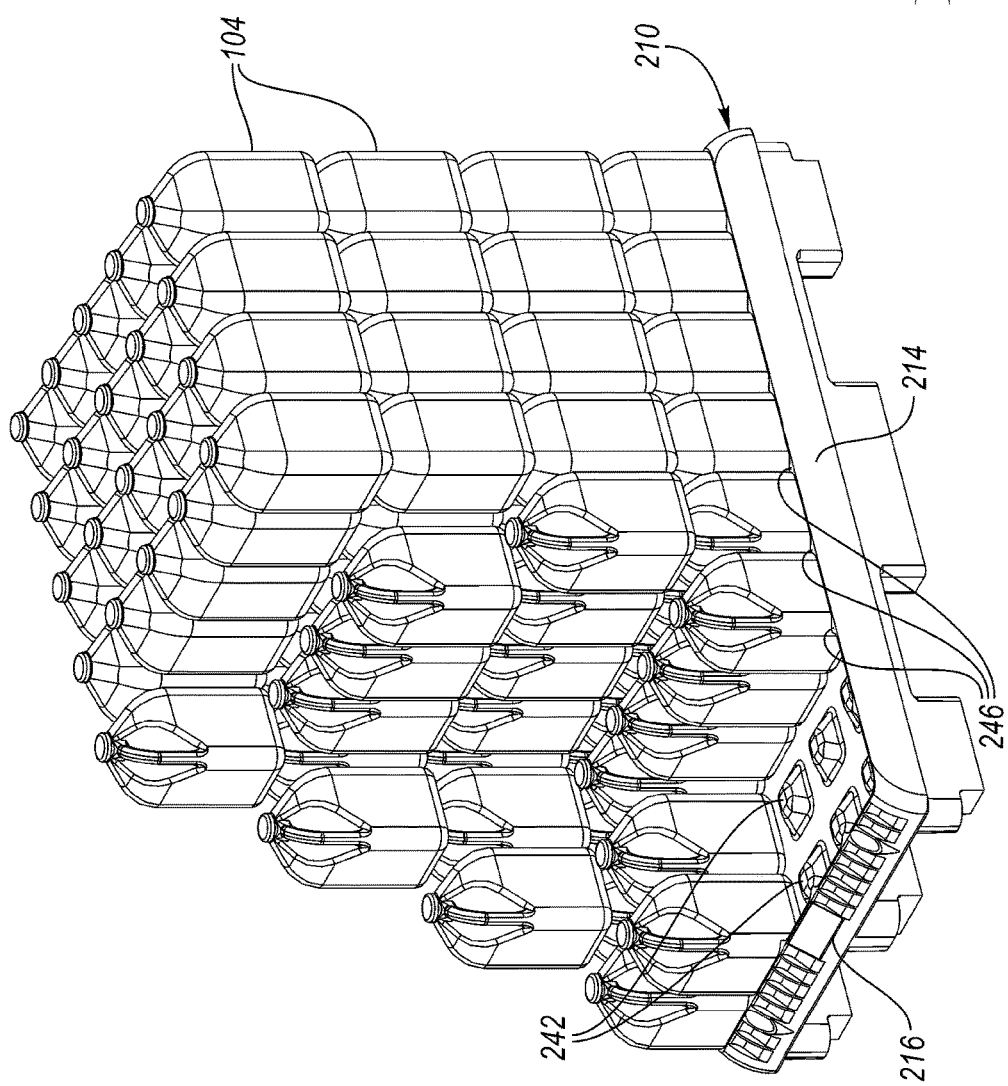
FIG. 11 shows a plurality of jugs stacked on the pallet of FIG. 10.

FIG. 11 shows a plurality of jugs 104 stacked on the pallet 210. Again, the jugs 104 shown are the stackable jugs 104 where the spout and cap of one jug 104 is received within a recess in the base of a jug 104 stacked thereon.

Figure 12:
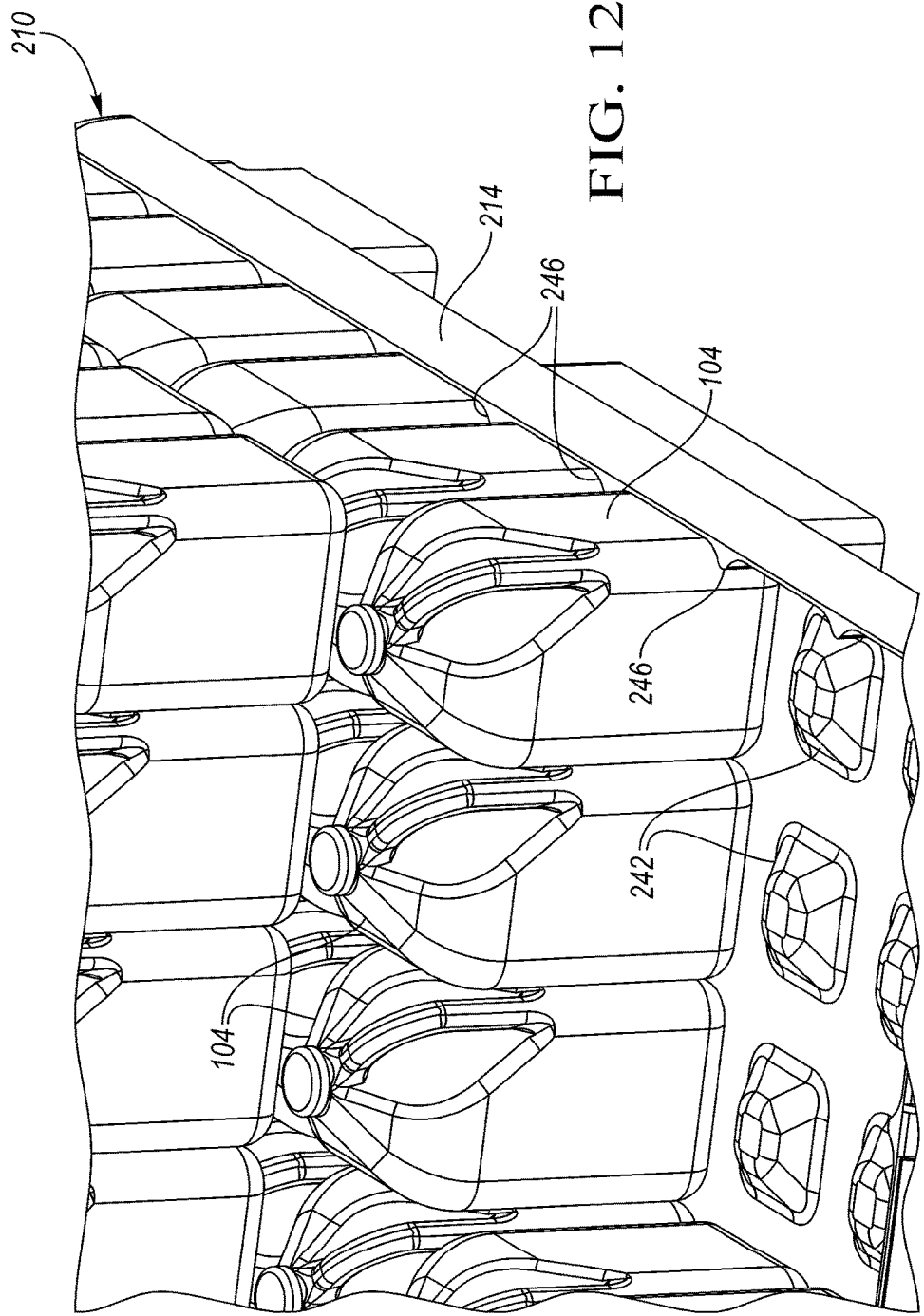
FIG. 12 is an enlarged view of a portion of FIG. 11.

FIG. 12 is an enlarged view of a portion of FIG. 11. As shown, the wedges 246 occupy the space between adjacent rounded corners of adjacent jugs 104. This increases the stability of the stacked jugs 104 on the pallet 210.

Figure 13:
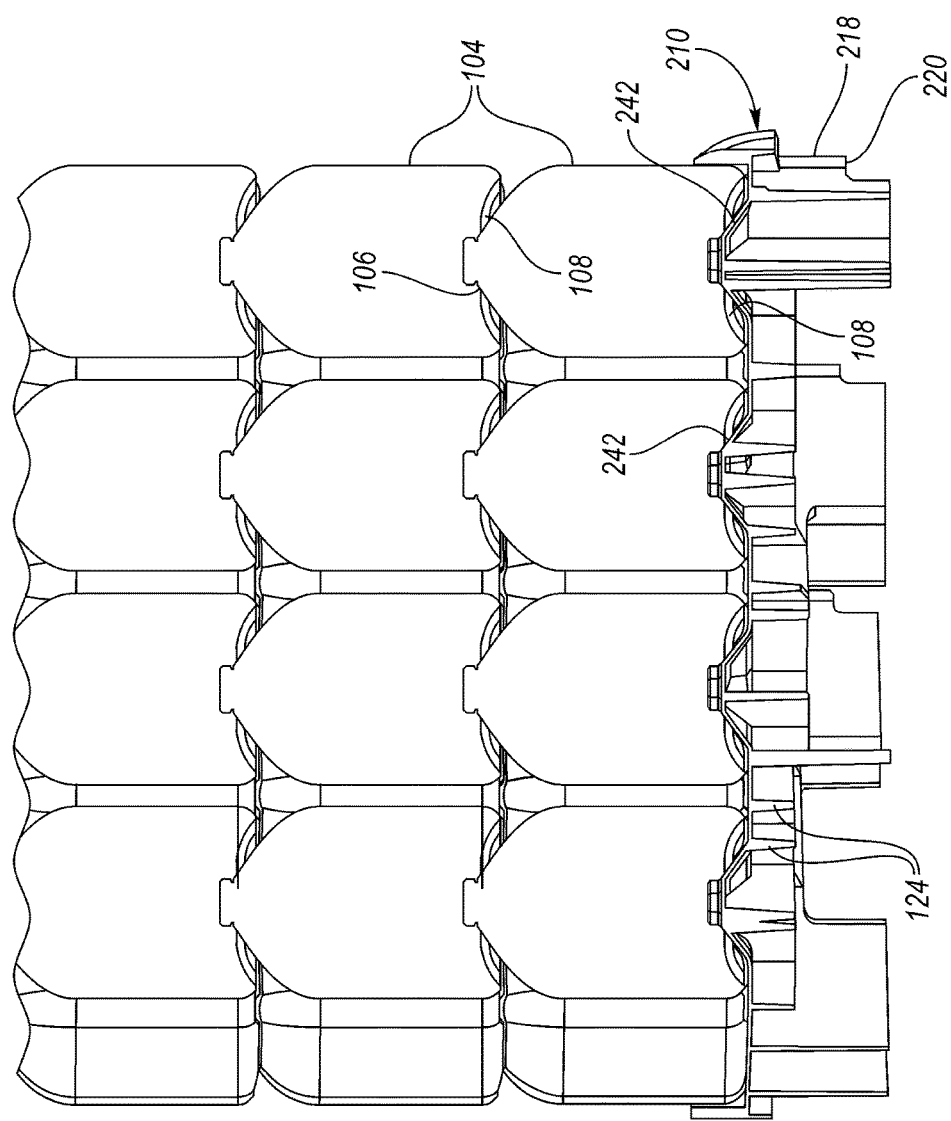
FIG. 13 is a section view through the pallet and some of the jugs of FIG. 11.

FIG. 13 is a section view through the pallet 210 and some of the jugs 104 of FIG. 11. The locating features 242 are received in the recesses 108 formed in the bases of the jugs 104. The spout and cap of the jugs 104 are received in the recesses 108 formed in the bases of the jugs 104 stacked thereon, as shown. This increases the stability of the stacked jugs 104 on the pallet 210.

Figure 14:
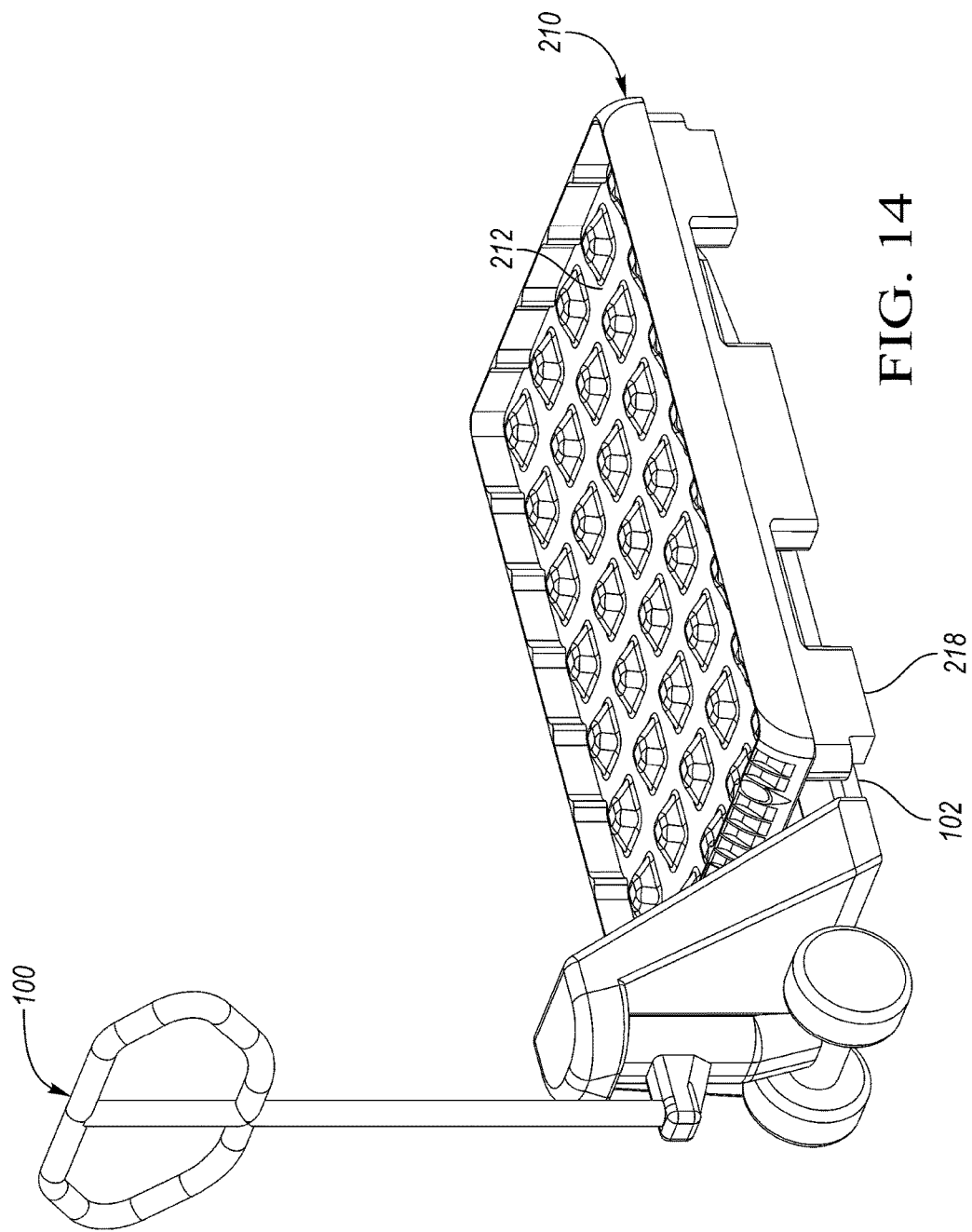
FIG. 14 shows a lift jack having tines inserted between the stringers of the pallet of FIG. 10 in a direction generally parallel to the stringers.
Figure 15:
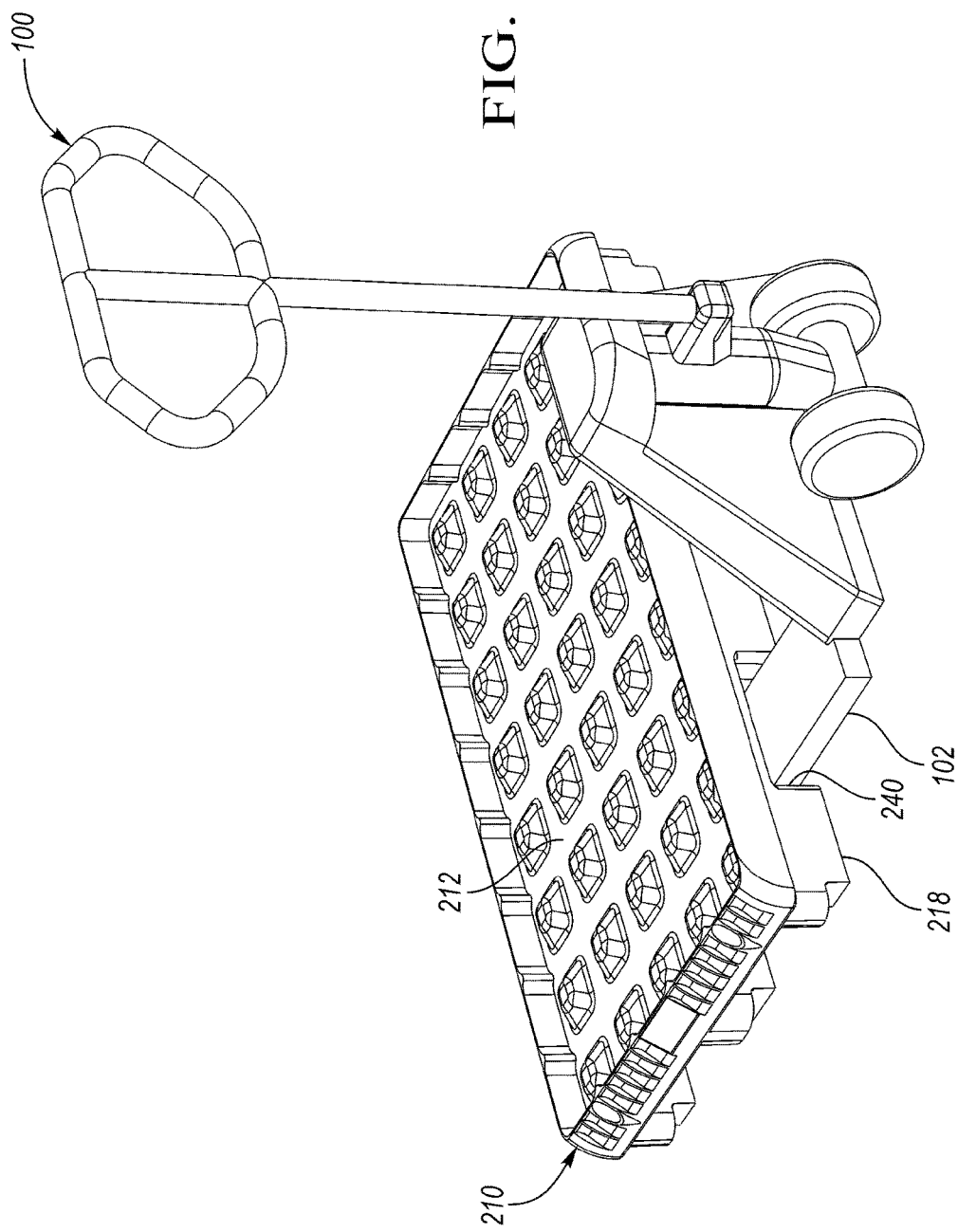
FIG. 15 shows the lift jack having tines inserted into the openings formed through the stringers of the pallet of FIG. 10.

As shown in FIG. 14, a lift jack 100 may be used to lift the pallet 210 by inserting the tines 102 between the stringers 218 in a direction generally parallel to the stringers 218. As shown in FIG. 15, the lift jack 100 tines 102 can also be inserted into the openings 240 formed through the stringers 218. The lift jack 100 can thus be used to access, lift and move the pallet 210 (loaded or unloaded) from either the long sides or the short sides of the pallet 210.

Figure 16:
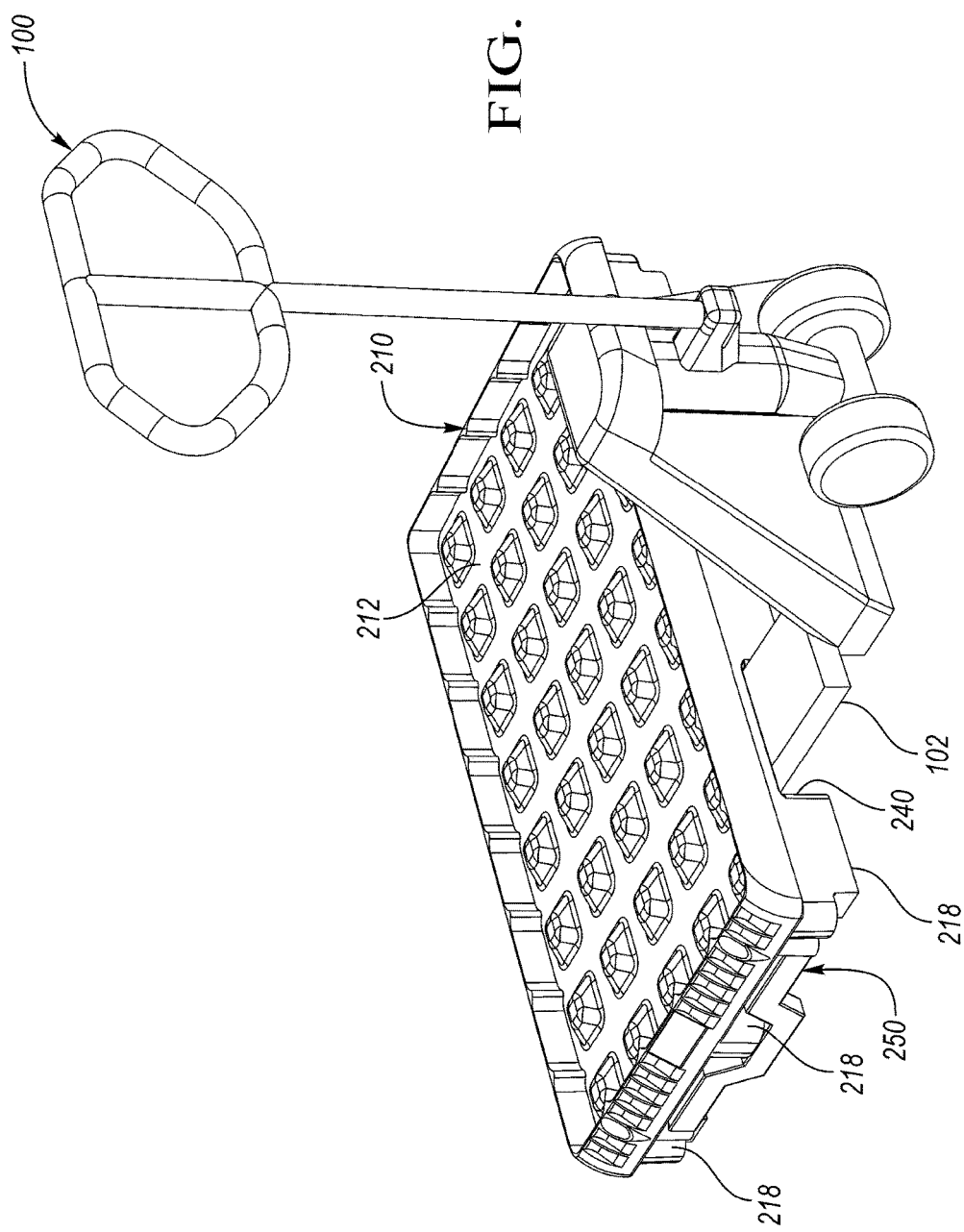
FIG. 16 shows the pallet lifted by the lift jack onto a dolly.
Figure 17:
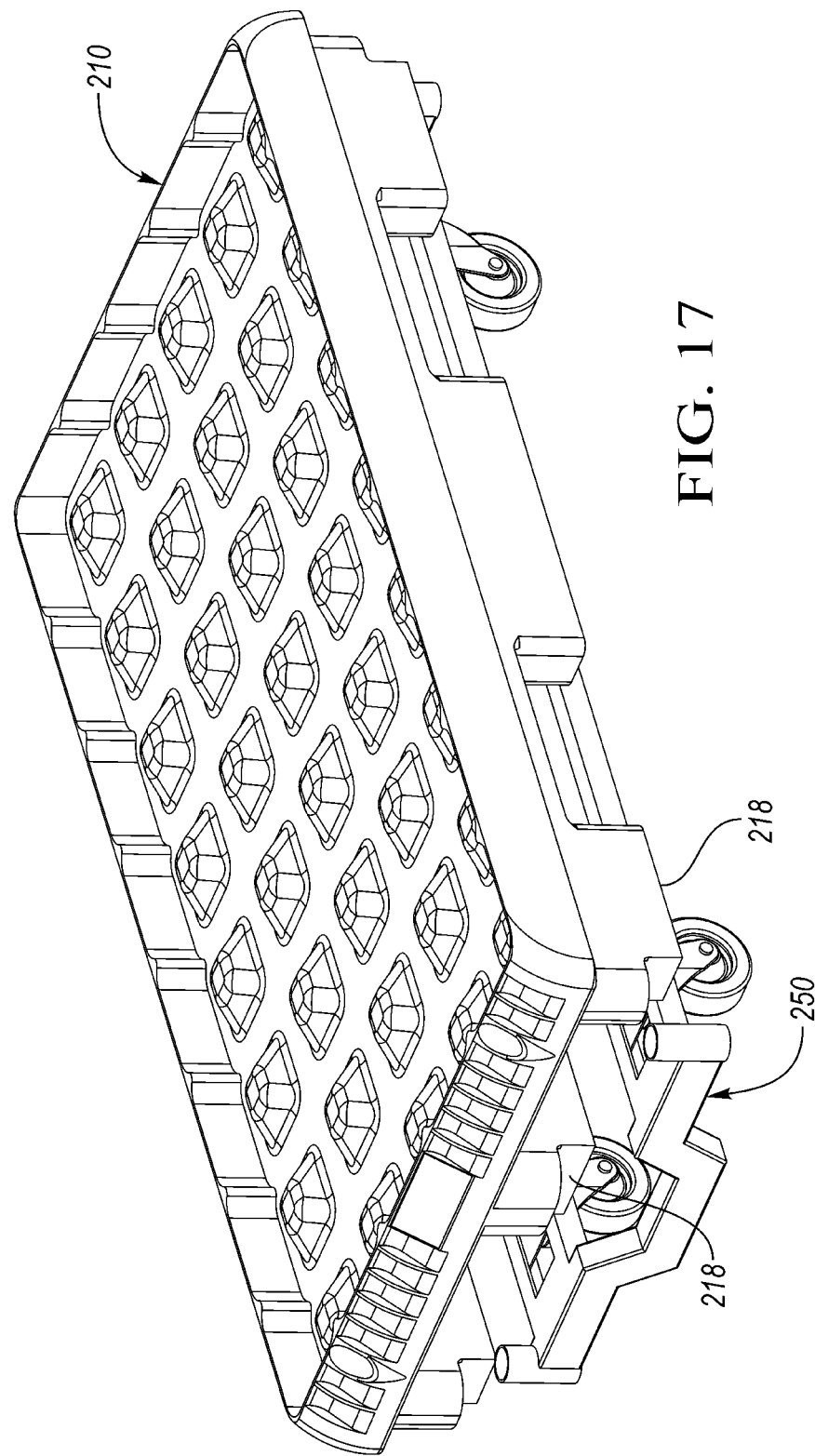
FIG. 17 is an exploded view of the pallet and dolly of FIG. 16.

As shown in FIG. 16, the pallet 210 can be lifted by the lift jack 100 onto dolly 250. FIG. 17 is an exploded view of the pallet 210 and dolly 250.

Figure 18:
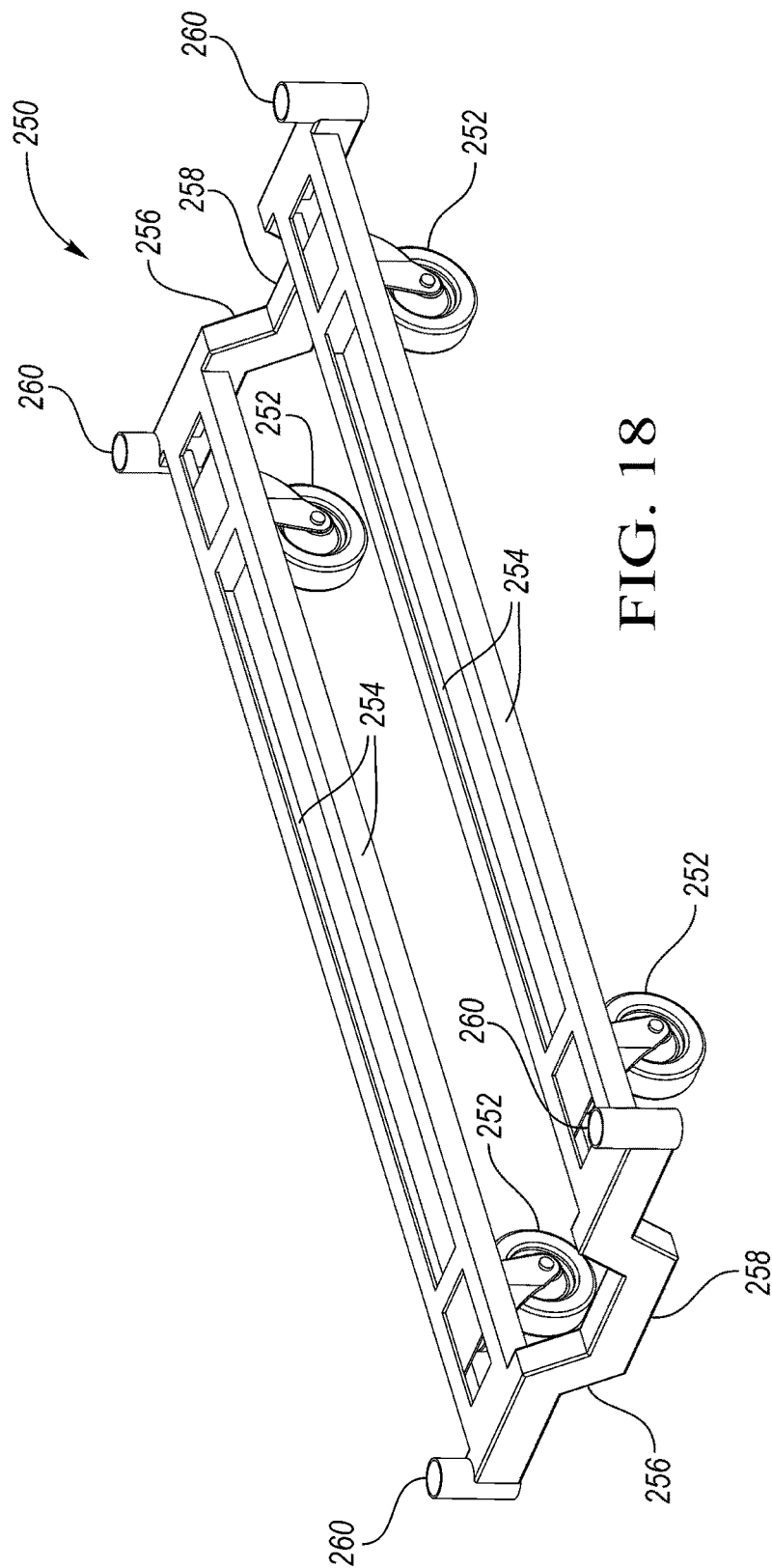
FIG. 18 is a perspective view of the dolly of FIG. 16.

FIG. 18 is a perspective view of the dolly 250. The dolly 250 includes a plurality of casters 252 (swiveling or non-swiveling) supporting a frame formed by longitudinal rails 254 (which may be L-brackets, as shown) connected to end rails 256. Each end rail 256 includes a center portion 258 that is lower than the longitudinal rails 254 and lower than the outer portions of the end rail 256. Cylinders 260 (or other hardware defining an opening) are positioned at each end of each end rail 256. The frame of the dolly 250, i.e. the longitudinal rails 254, the end rails 256 and the cylinders 260 may be formed of metal or alternatively molded as a single piece of plastic. The cylinders 260 may be received into cylindrical openings in the end walls of the pallet (FIG. 19).

Figure 19:
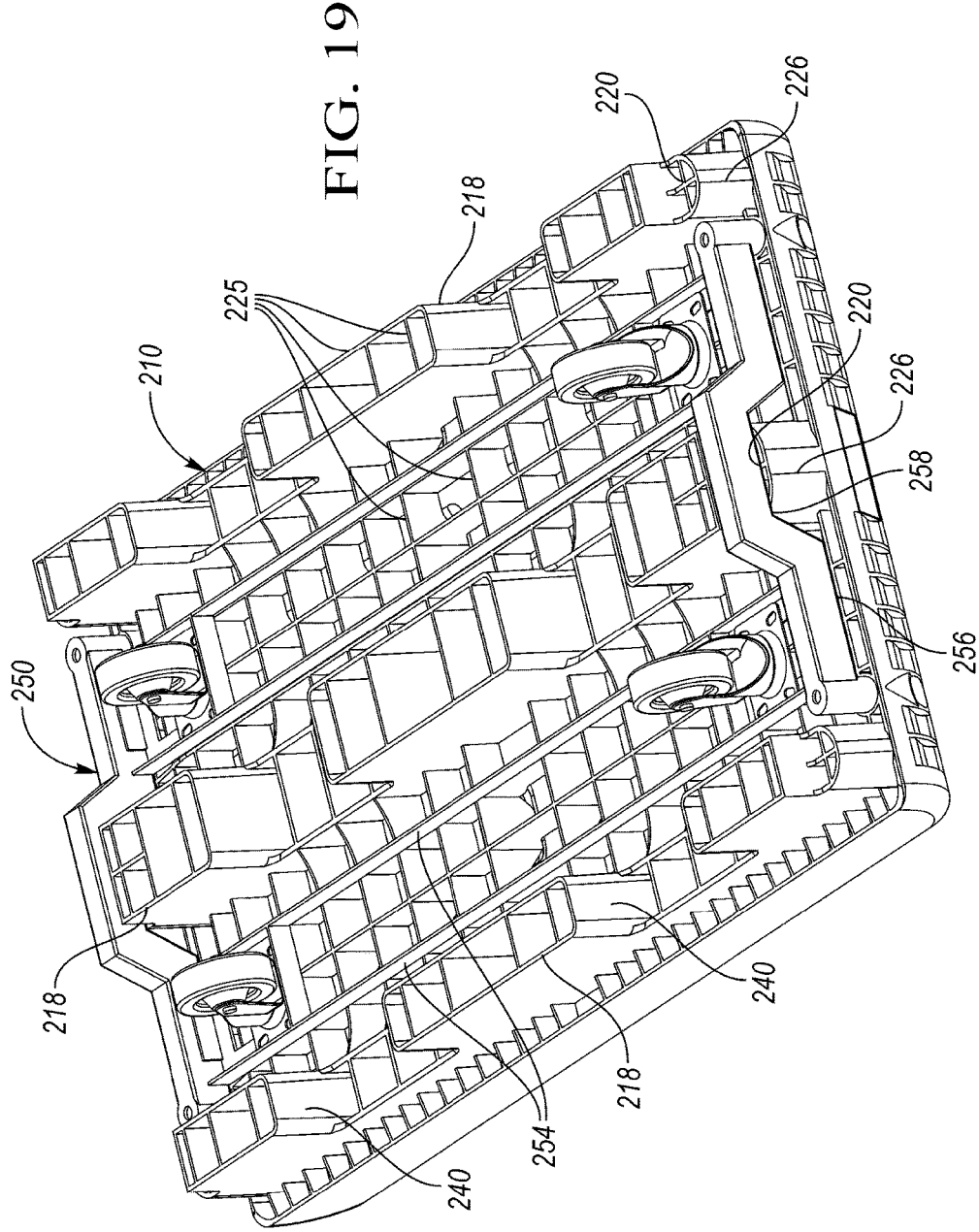
FIG. 19 is a bottom perspective view of the pallet and dolly of FIG. 16.

FIG. 19 is a bottom perspective view of the pallet 210 and dolly 250. As shown, the center portion 258 of the end rail 256 is received in the notch 220 of the center stringer 218. The longitudinal rails 254 are recessed relative to the stringers 218, including the portions of the stringers 218 above the transverse openings 240.

Figure 20:
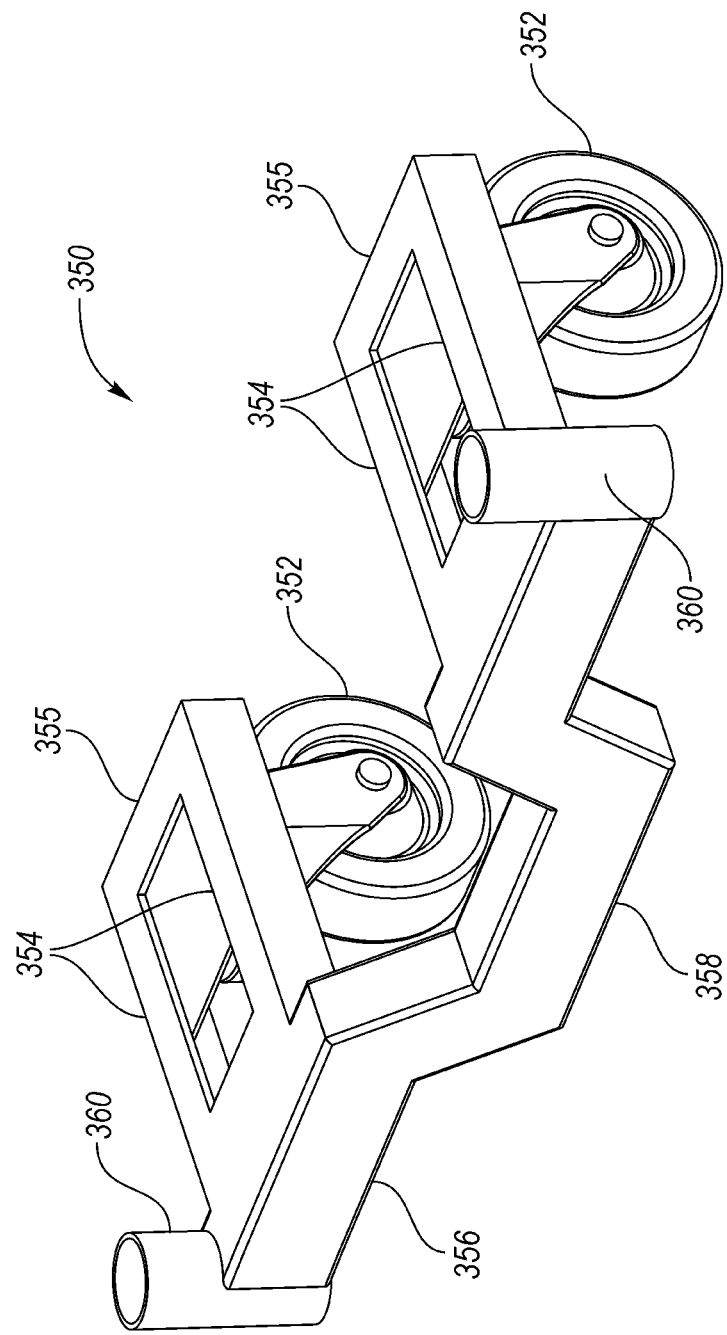
FIG. 20 shows an alternate dolly.
Figure 21:
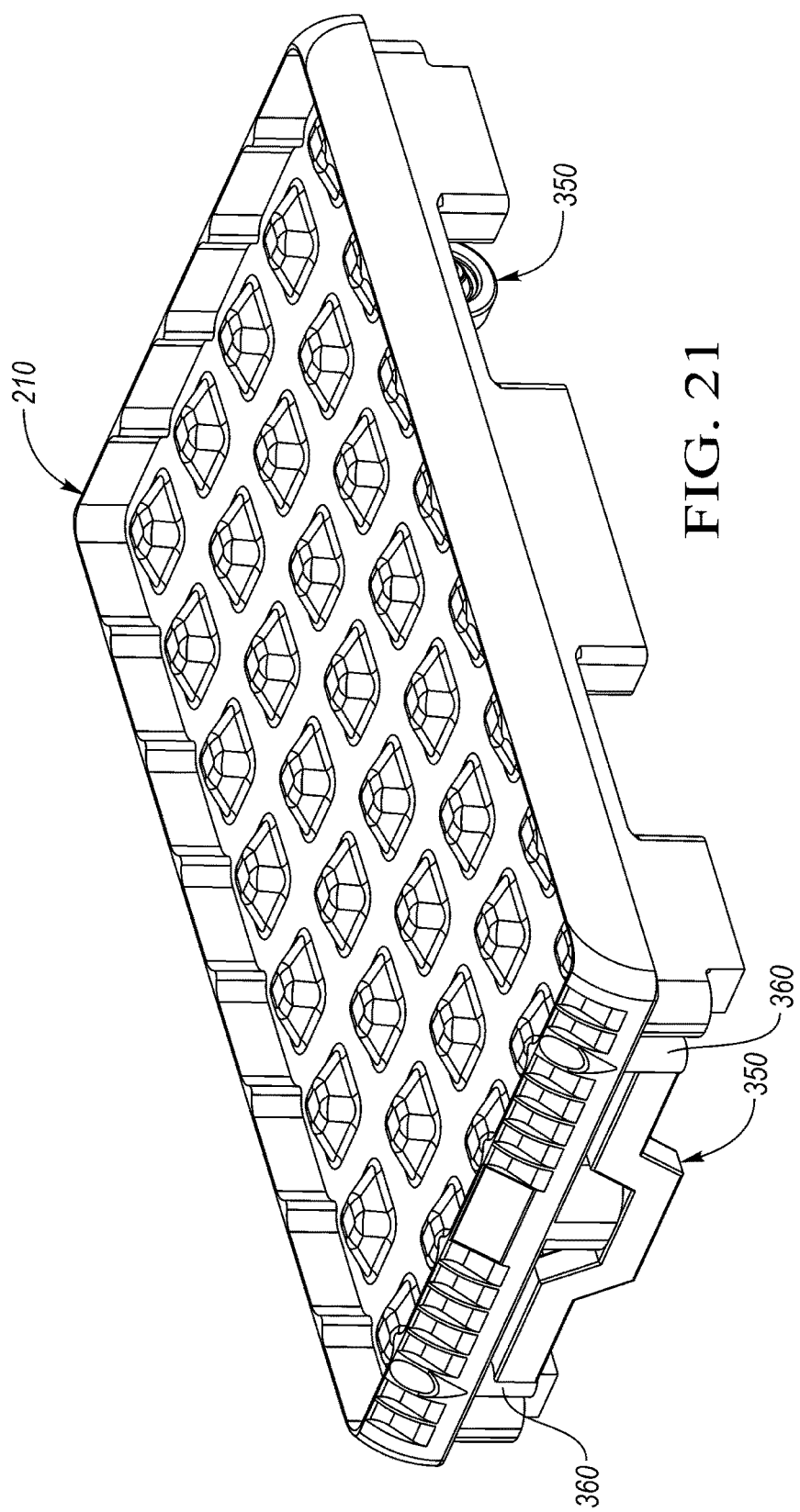
FIG. 21 shows the end of the pallet set upon the longitudinal rails of the dolly.

An alternate dolly 350 is shown in FIG. 20. The dolly 350 is similar to one end portion of the dolly 250 of FIG. 18. The dolly 350 includes a body portion having an end rail 356 with a center portion 358 that is lower than the outer portions of the end rail 356 and lower than longitudinal rails 354. The longitudinal rails 354 in this embodiment are short and terminate with cross-rail 355 to create a mounting bracket for the caster 352. The dolly 350 is designed such that one dolly 350 is used to support each end of the pallet 210, as shown in FIG. 21. Cylinders 360 extend from corners of the dolly 350 sliding into openings in the pallet 210. The cylinders 360 are also connectors to a handle.

Figure 23:
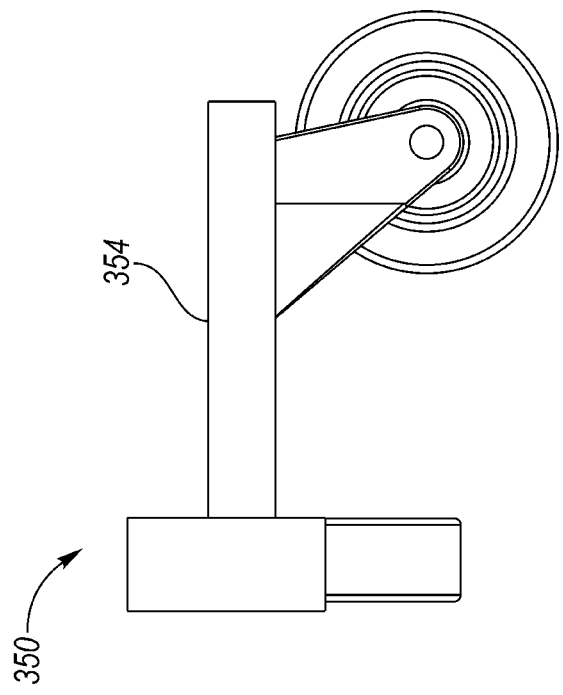
FIG. 23 shows the dolly of FIG. 22 straightened as it would under a pallet.
Figure 22:
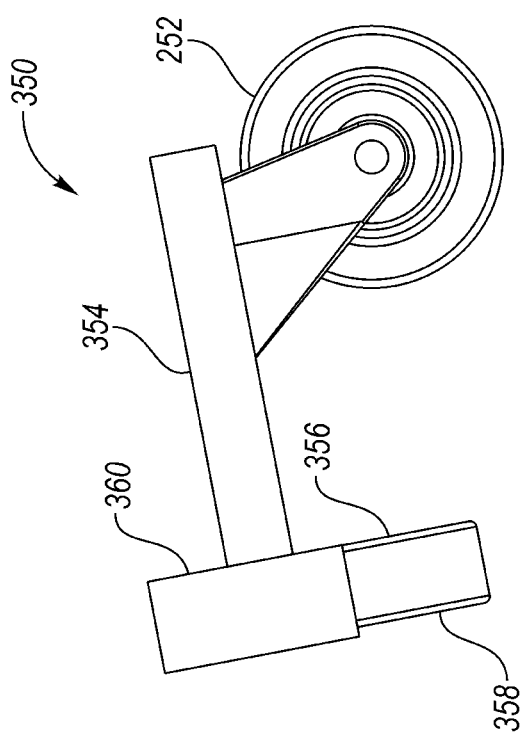
FIG. 22 shows the dolly resting on a floor.

As shown in FIG. 22, by itself, the dolly 350 does not stand up straight (having only two casters 352), but tilts over onto the center portion 358 of the end rail 356. When the end of the pallet 210 (FIG. 21) is set upon the longitudinal rails 354, the dolly 350 straightens, as shown in FIG. 23.

Figure 24:
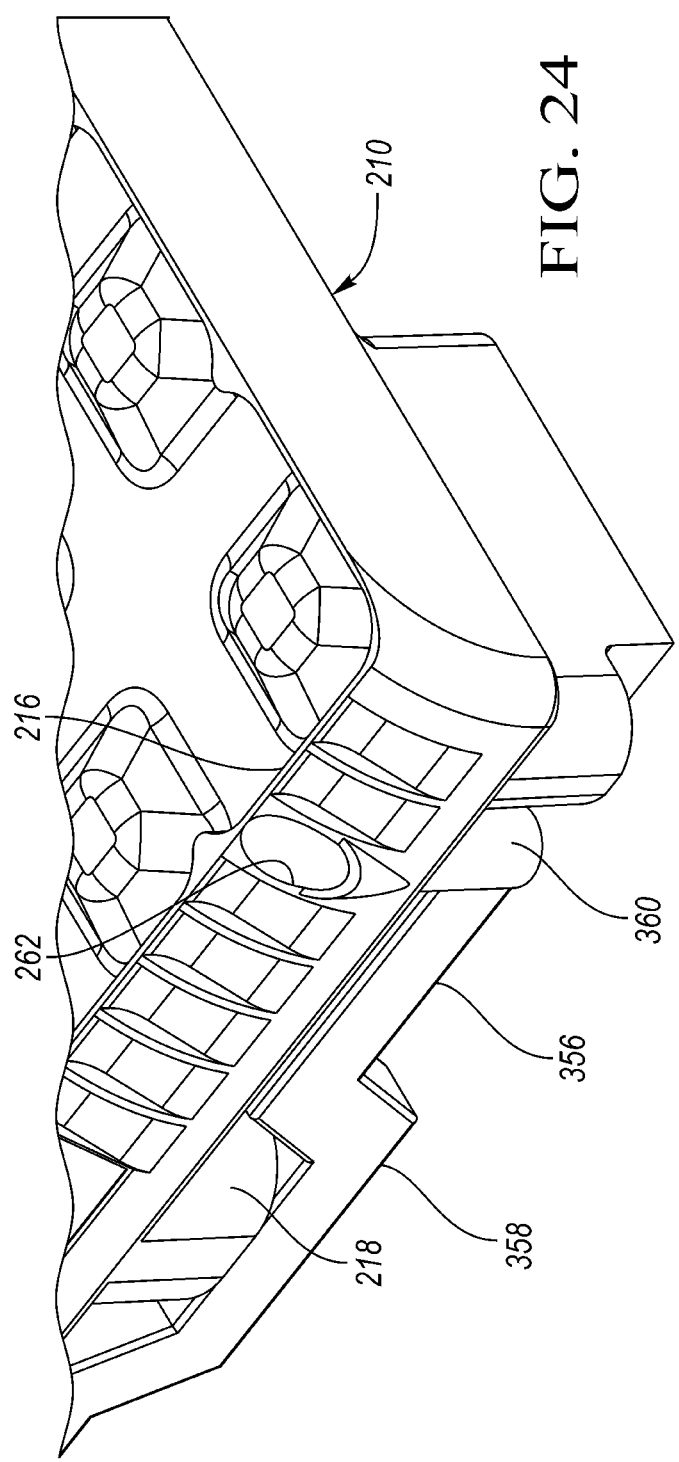
FIG. 24 is an enlarged perspective view of one end of the pallet of FIG. 10 on the dolly of FIG. 20.
Figure 25:
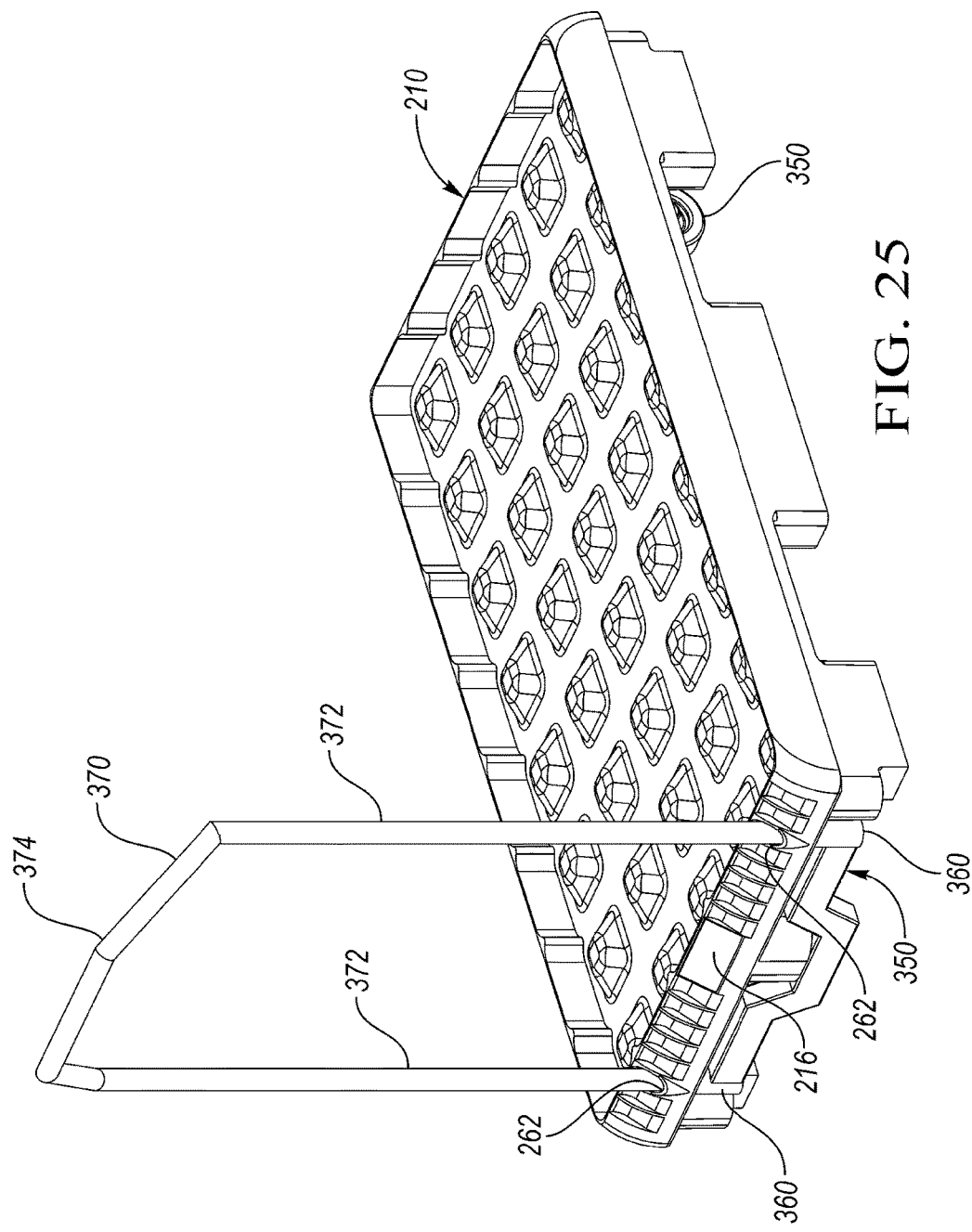
FIG. 25 shows a handle attached to the pallet and dolly of FIG. 24.
Figure 26:
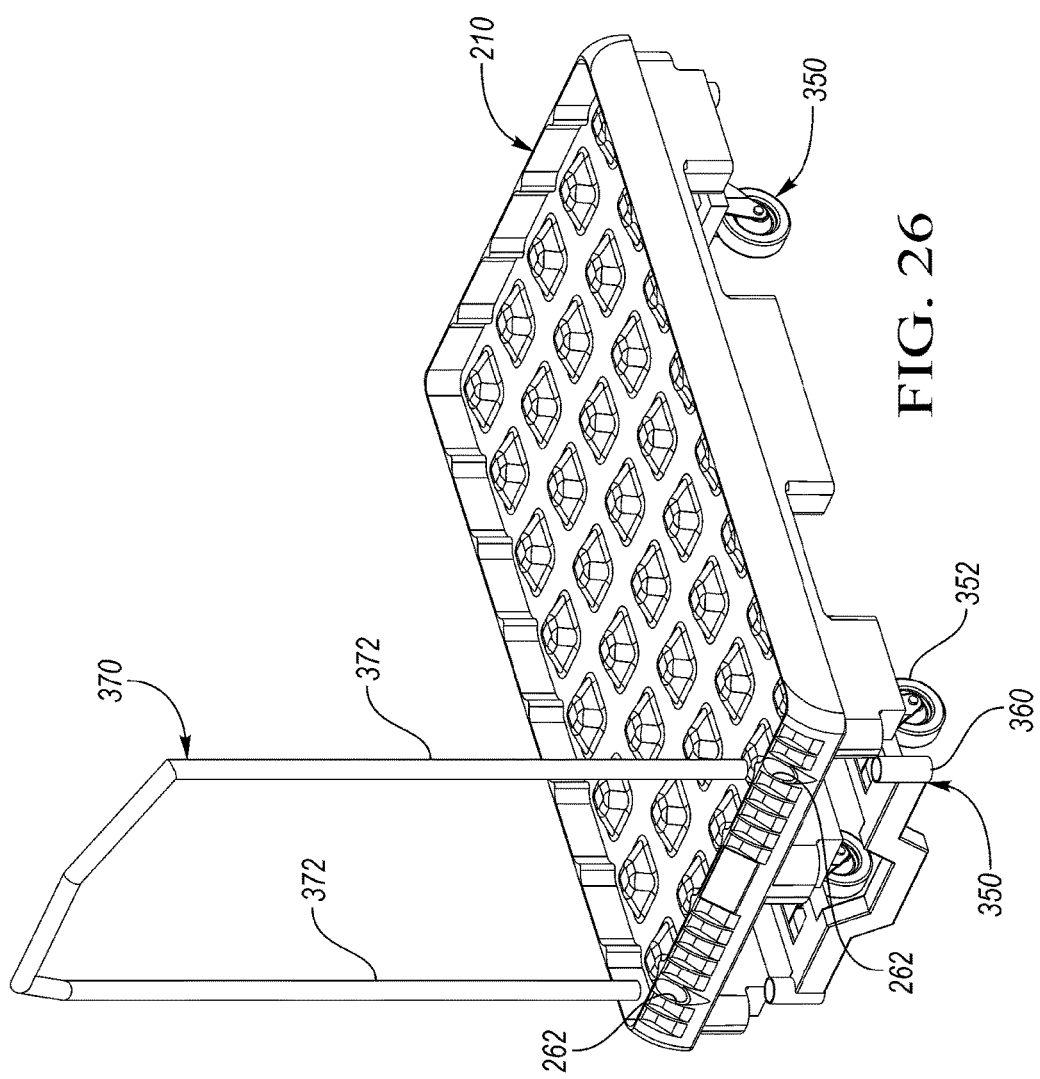
FIG. 26 is an exploded view of the handle, pallet and dollies of FIG. 25.
Figure 27:
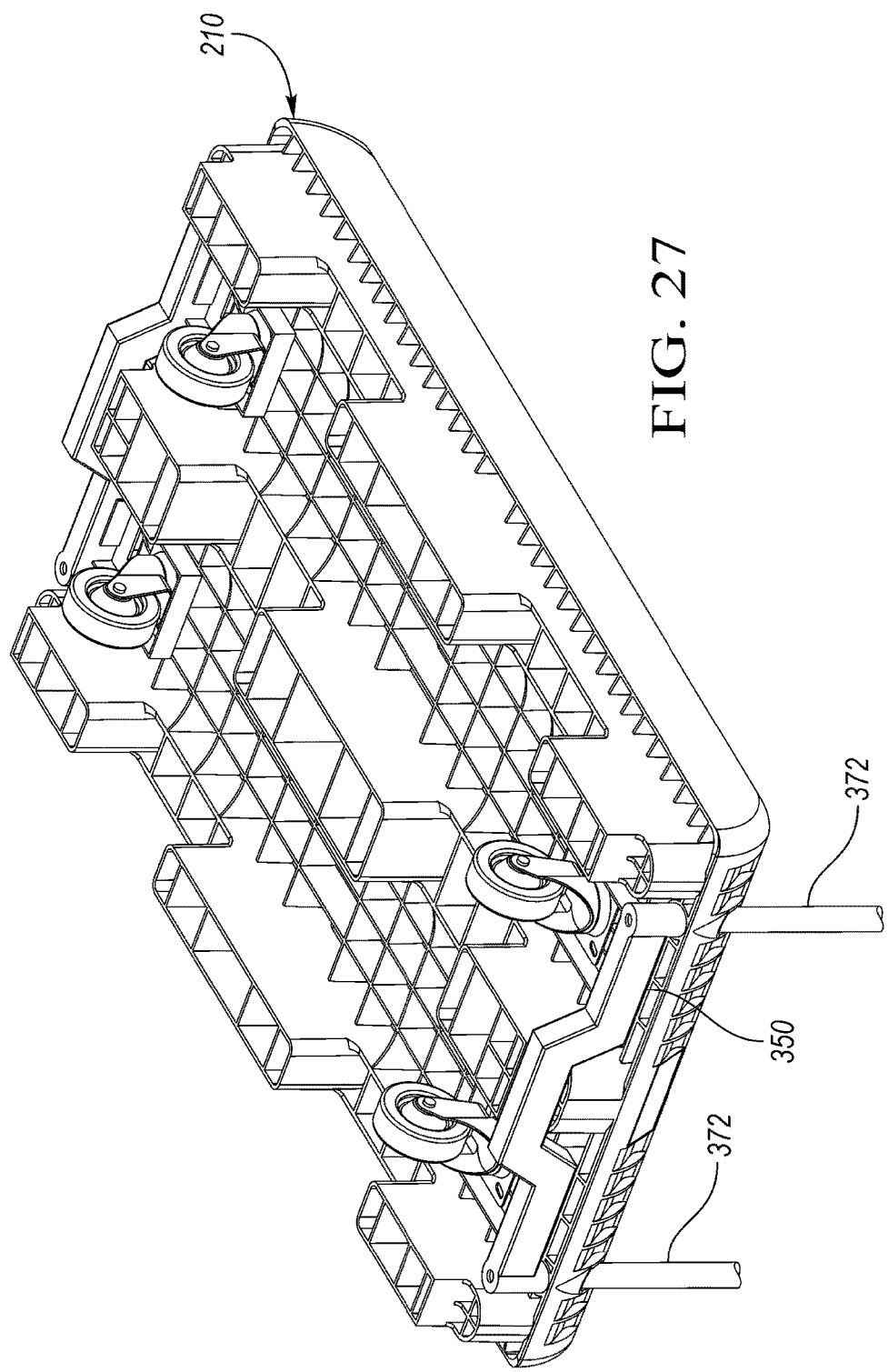
FIG. 27 is a bottom perspective view of the assembly of FIG. 25.

FIG. 24 is an enlarged perspective view of one end of the pallet 210 on the dolly 350 (although it could also be dolly 250 of FIG. 18). As shown, the cylinder 360 is received at least partially within a vertical opening 262 through the end wall 216. Referring to FIG. 25, this permits the attachment of a handle 370. The handle 370 includes a pair of spaced apart (preferably) parallel vertical rails 372. At least one cross bar 374 connects upper ends of the vertical rails 372. Lower ends of the vertical rails 372 are inserted through the openings 362 in the end wall 216 and into the cylinders 360 of the dolly 350. This secures the handle 370 to both the pallet 210 and the dolly 350, such that force pulling or pushing on the handle 370 transfers force directly to both the pallet 210 and to the dolly 350. FIG. 26 is an exploded view of the handle 370, pallet 210 and dollies 350. FIG. 27 is a bottom perspective view of the assembly of FIG. 25.

Figure 28:
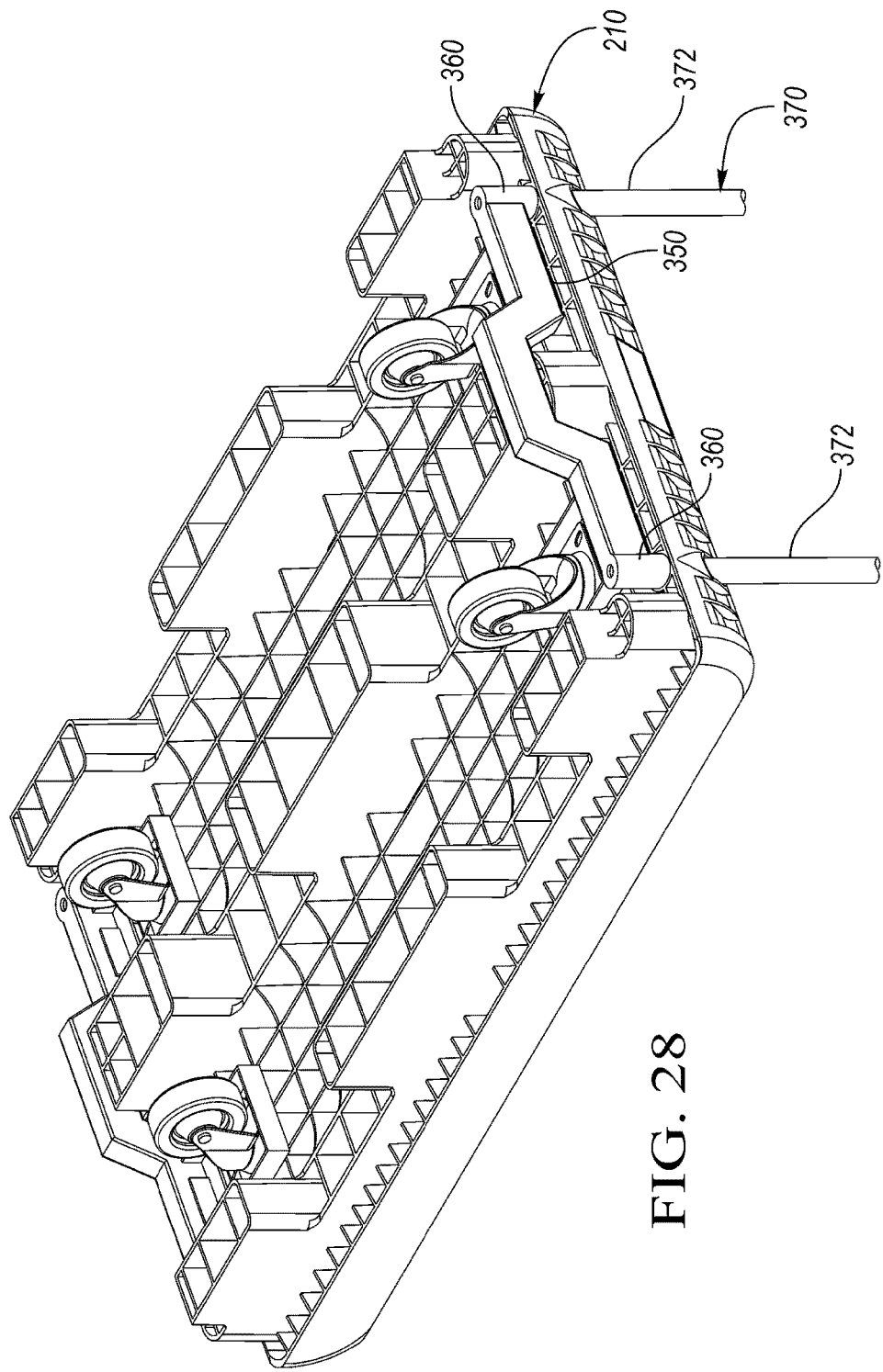
FIG. 28 is a bottom perspective view of the handle and pallet of FIG. 25 with an alternate dolly.
Figure 29:
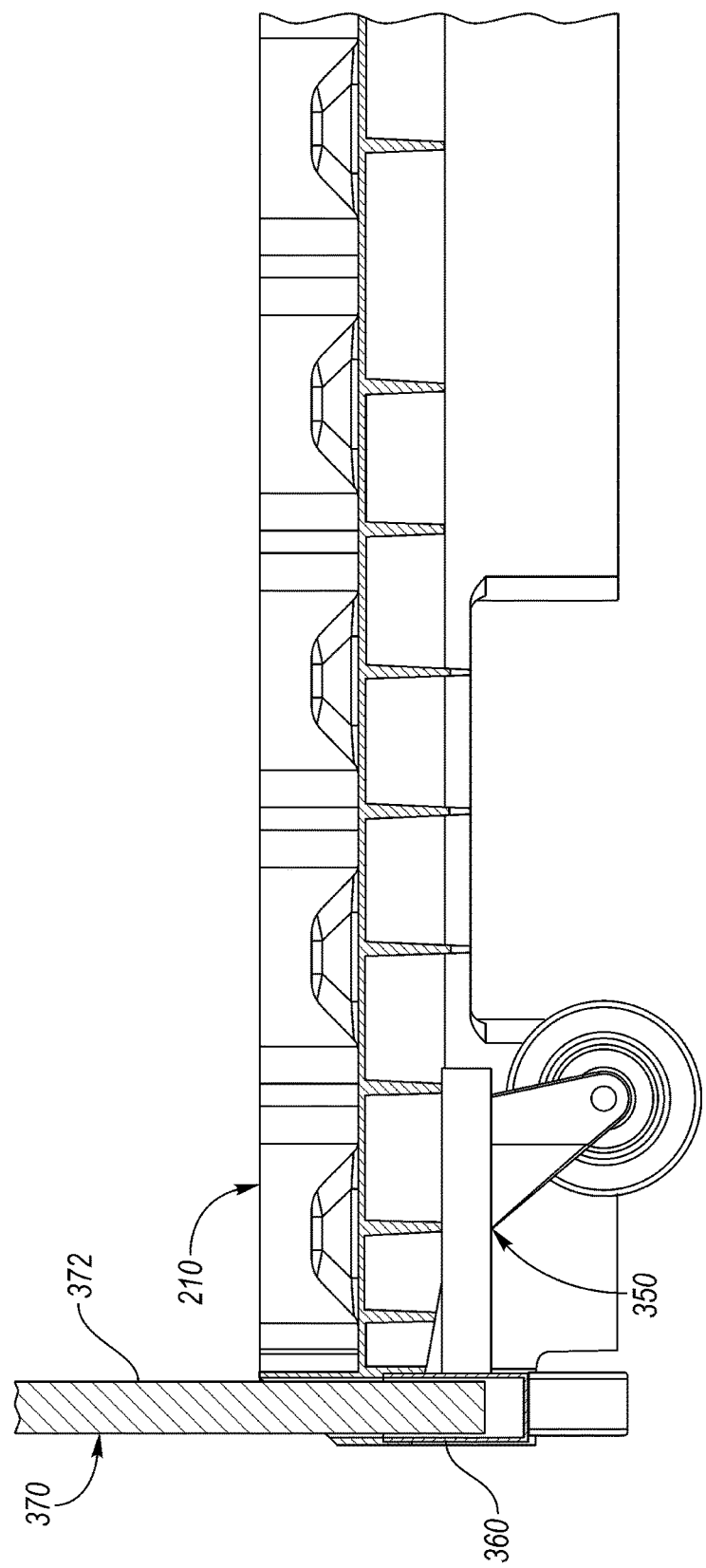
FIG. 29 is a section view through the handle, pallet and dolly of FIG. 28.

In FIGS. 28-29, the vertical rails 372 of the handle 370 are inserted into a dolly 350 where the bottoms of the cylinders 360 are closed.

Figure 30:
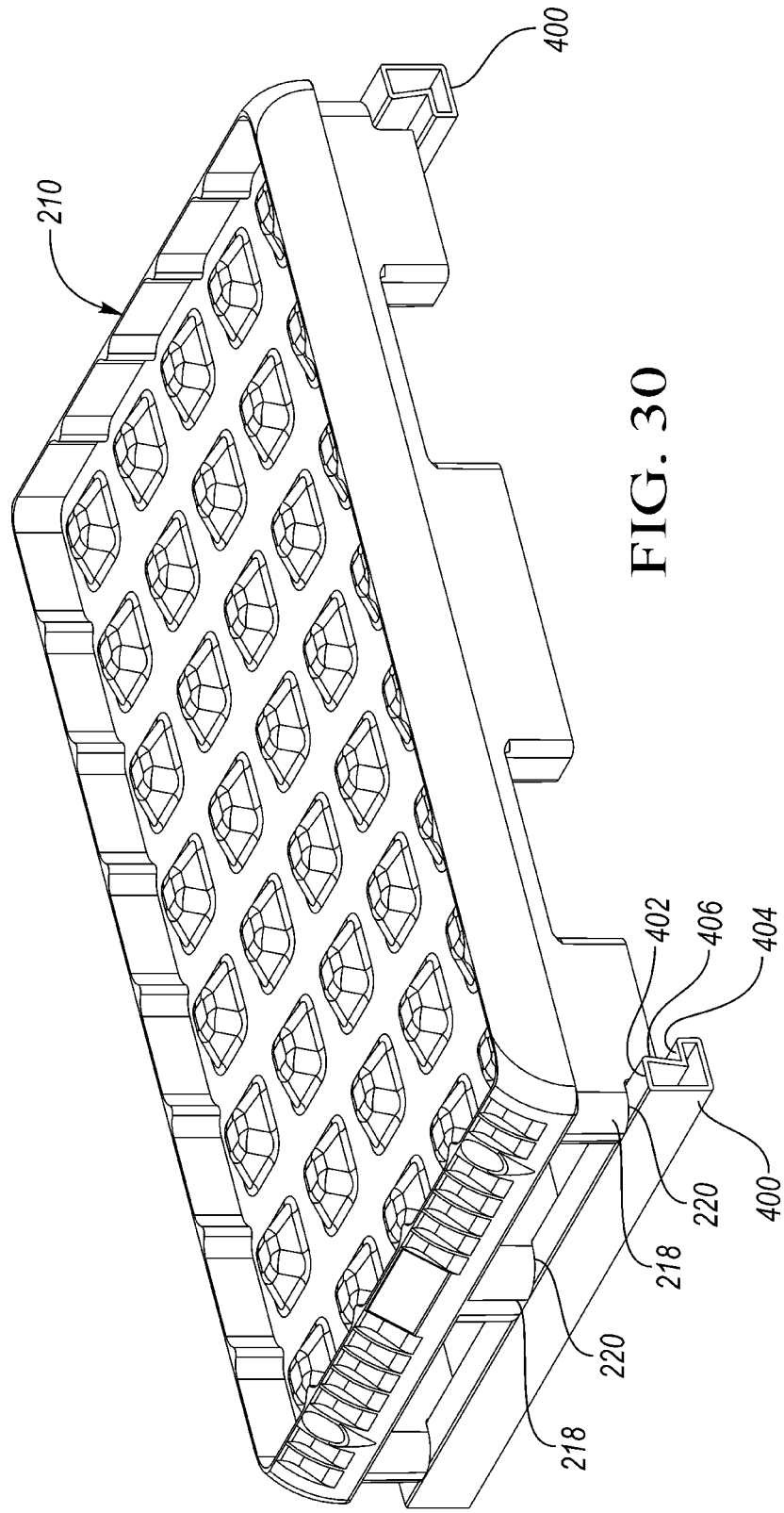
FIG. 30 is a perspective view of the pallet of FIG. 10 supported at its ends on supports of a rack.
Figure 31:
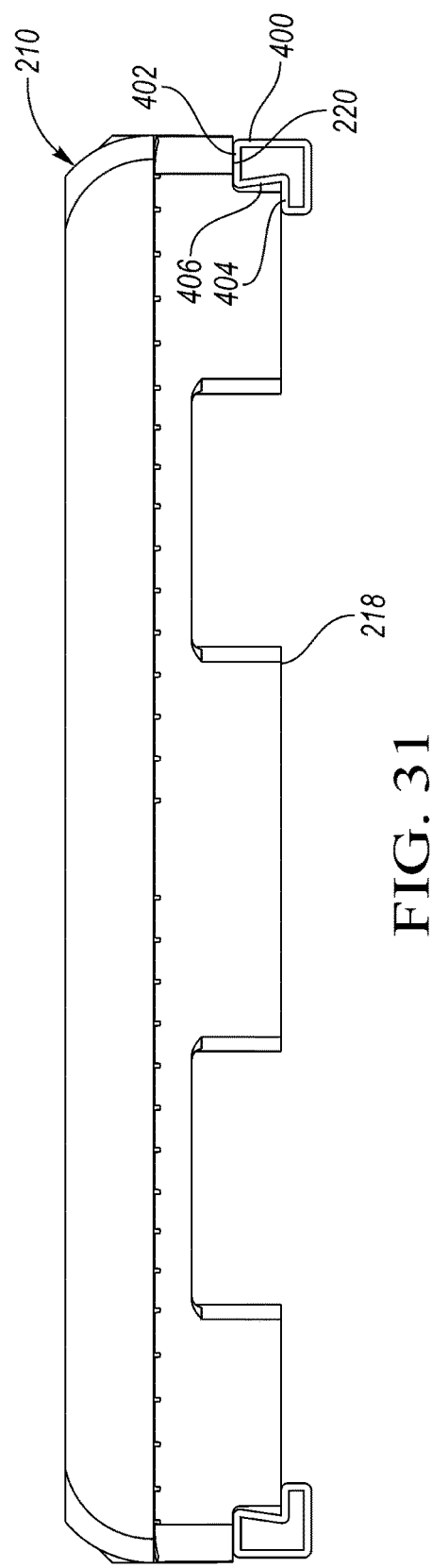
FIG. 31 is a side view of the pallet and rack supports of FIG. 30.

As shown in FIGS. 30 and 31, the pallet 210 is rackable. In other words, it can be supported at both ends and suspended in the middle (even when loaded). The rack may include supports 400 at each end of the pallet 210. Each support 400 includes an upper surface 402 and a lower surface 404 defined by a recess 406. The notches 220 of the stringers 218 are complementary to the notched edges of the supports 400. The stringers 218 rest on the lower surface 404 and on the upper surface 402.

All of the example pallets disclosed herein injection molded as a single piece of plastic, such as HDPE, polypropylene or other suitable material.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, in some implementations, the supports could be columns instead of stringers and the pallet could be a nestable pallet.

What is claimed is:

1. A pallet comprising:
    a deck having an upper surface for supporting goods thereon, the deck including a plurality of ribs extending downward; and
    a plurality of stringers extending downward below the deck, wherein the stringers project downward below a lower surface of the deck, each stringer including a plurality of floor-contacting columns and extending downward below the lower surface of the deck between the columns, wherein the stringers each include a notch at each outermost end, each notch opening downward and outward and configured to engage a support in a rack.

2. The pallet of claim 1 wherein the deck includes a lip extending upward from a periphery of the deck.

3. The pallet of claim 1 wherein the deck includes a pair of opposed side walls and a pair of opposed end walls extending upward from a periphery of the deck.

4. The pallet of claim 1 wherein the deck includes an upper wall, the plurality of ribs extending downward from the upper wall, wherein a subset of the plurality of ribs extend further downward to form the stringers.

5. The pallet of claim 1 wherein the deck includes a plurality of locating features projecting upward.

6. The pallet of claim 5 wherein the plurality of locating features are each generally in the shape of a pyramid.

7. The pallet of claim 6 further including a lip extending upward from a periphery of the deck.

8. The pallet of claim 7 further including a plurality of dividers projecting inward from the lip.

9. The pallet of claim 8 further including a plurality of plastic jugs on the deck, each of the jugs including a bottom wall having a recess, each of the locating features received in one of the recesses in one of the jugs, the dividers abutting outer walls of the jugs.

10. The pallet of claim 5 further including a plurality of plastic jugs on the deck, each of the jugs including a bottom wall having a recess, each of the locating features received in one of the recesses in one of the jugs.

11. A pallet comprising:
    a deck having an upper surface for supporting goods thereon, the deck including a plurality of ribs extending downward, wherein the deck includes an upper wall, the plurality of ribs extending downward from the upper wall; and
    a plurality of stringers extending downward below the deck, a subset of the plurality of ribs extending further downward from the upper wall of the deck to form the stringers, wherein the stringers each include a notch at each outermost end, each notch opening downward and outward and configured to engage a support in a rack, each notch formed by intermediate ribs extending downward from the upper wall less than the subset of the plurality of ribs that form a main portion of the stringers, wherein the intermediate ribs are at the outermost ends of the stringers.

12. The pallet of claim 11 wherein the deck includes a plurality of locating features projecting upward.

13. The pallet of claim 12 wherein the plurality of locating features are each generally in the shape of a pyramid.

14. The pallet of claim 13 further including a lip extending upward from a periphery of the deck.

15. The pallet of claim 14 further including a plurality of dividers projecting inward from the lip.

16. The pallet of claim 15 further including a plurality of plastic jugs on the deck, each of the jugs including a bottom wall having a recess, each of the locating features received in one of the recesses in one of the jugs, the dividers abutting outer walls of the jugs.

17. The pallet of claim 12 further including a plurality of plastic jugs on the deck, each of the jugs including a bottom wall having a recess, each of the locating features received in one of the recesses in one of the jugs.

18. A pallet comprising:
    a deck having an upper surface for supporting goods thereon, the deck including a plurality of ribs extending downward;
    a plurality of stringers extending downward below the deck; and
    end walls extending upward from end edges of the deck, a plurality of convex ribs on an outer surface of the end walls, wherein the convex ribs are generally vertical and generally perpendicular to the deck, wherein the convex ribs each have a convex outer edge.

19. The pallet of claim 1 wherein the stringers each include openings therethrough for receiving the tines of a pallet lift.

20. In combination:
    A pallet comprising a deck having an upper surface for supporting goods thereon, the deck including a plurality of ribs extending downward, the pallet further comprising a plurality of stringers extending downward below the deck; and
    a dolly having at least two wheels supporting a body portion, a handle extending through the pallet and connecting to the body portion of the dolly.

21. The pallet and dolly of claim 20 wherein the dolly is a first dolly and further including a second dolly supporting the pallet, wherein the first dolly supports a first end of the pallet and the second dolly supports a second end of the pallet.

* * * * *